United States Patent
Wang et al.

(10) Patent No.: US 10,777,205 B2
(45) Date of Patent: Sep. 15, 2020

(54) VOICE CONTROL PROCESSING METHOD AND APPARATUS

(71) Applicant: Huawei Technologies Co., Ltd., Shenzhen (CN)

(72) Inventors: Yahui Wang, Beijing (CN); Wenmei Gao, Beijing (CN); Xiaojuan Li, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/764,750

(22) PCT Filed: Sep. 30, 2015

(86) PCT No.: PCT/CN2015/091181
§ 371 (c)(1),
(2) Date: Mar. 29, 2018

(87) PCT Pub. No.: WO2017/054158
PCT Pub. Date: Apr. 6, 2017

(65) Prior Publication Data
US 2019/0043510 A1 Feb. 7, 2019

(51) Int. Cl.
*H04W 28/02* (2009.01)
*G10L 17/22* (2013.01)
(Continued)

(52) U.S. Cl.
CPC .............. *G10L 17/22* (2013.01); *G06F 3/167* (2013.01); *G06F 9/445* (2013.01); *G10L 15/285* (2013.01);
(Continued)

(58) Field of Classification Search
None
See application file for complete search history.

(56) References Cited

U.S. PATENT DOCUMENTS 7,149,291 B1 * 12/2006 Deshpande ............. H04L 47/10
379/112.01
8,219,721 B2 * 7/2012 Shan ..................... G06F 1/3209
710/18
(Continued)

FOREIGN PATENT DOCUMENTS

CN 101472237 A 7/2009
CN 101751361 A 6/2010
(Continued)

OTHER PUBLICATIONS

Machine Translation and Abstract of Chinese Publication No. CN104134442, Nov. 5, 2014, 10 pages.
(Continued)

*Primary Examiner* — Richard Z Zhu
(74) *Attorney, Agent, or Firm* — Conley Rose, P.C.

(57) ABSTRACT

A voice control processing method and apparatus, where the method includes enabling, by a terminal in a data service disabled state, a data service after the terminal receives a voice instruction using a first application, where the first application is an application program used for voice control in the terminal, prohibiting, by the terminal, another application other than the first application in the terminal from using the data service, and controlling, by the terminal, the first application to execute the voice instruction using the data service, after the terminal enables the data service. The terminal in a data service disabled state receives the voice instruction. Then, the terminal enables the data service and prohibits another application from using the data service.

20 Claims, 18 Drawing Sheets

(51) Int. Cl.

| | | |
|---|---|---|
| *G06F 3/16* | (2006.01) | |
| *G06F 9/445* | (2018.01) | |
| *G10L 15/28* | (2013.01) | |
| *H04L 12/26* | (2006.01) | |
| *H04L 12/803* | (2013.01) | |
| *G10L 17/06* | (2013.01) | |
| *G10L 15/30* | (2013.01) | |
| *G10L 25/75* | (2013.01) | |
| *G10L 25/51* | (2013.01) | |
| *G06F 1/3209* | (2019.01) | |
| *H04W 28/00* | (2009.01) | |

(52) U.S. Cl.
CPC .............. *G10L 17/06* (2013.01); *H04L 43/16* (2013.01); *H04L 47/125* (2013.01); *G06F 1/3209* (2013.01); *G10L 15/30* (2013.01); *G10L 25/51* (2013.01); *G10L 25/75* (2013.01); *H04W 28/00* (2013.01); *H04W 28/02* (2013.01)

(56) References Cited

U.S. PATENT DOCUMENTS

| | | | | |
|---|---|---|---|---|
| 8,750,208 | B1* | 6/2014 | Chindapol | G06F 21/00 370/328 |
| 9,245,527 | B2* | 1/2016 | Lindahl | G10L 15/32 |
| 9,306,771 | B1* | 4/2016 | Vivanco | H04L 47/10 |
| 9,818,407 | B1* | 11/2017 | Secker-Walker | G10L 15/32 |
| 2003/0182131 | A1* | 9/2003 | Arnold | G10L 15/32 704/275 |
| 2004/0059827 | A1 | 3/2004 | Chiang et al. | |
| 2006/0252457 | A1 | 11/2006 | Schrager | |
| 2007/0133603 | A1* | 6/2007 | Weaver | H04L 43/0882 370/468 |
| 2008/0165695 | A1* | 7/2008 | Charzinski | H04L 47/10 370/252 |
| 2010/0023876 | A1* | 1/2010 | Shuf | H04L 12/1827 715/753 |
| 2012/0009883 | A1 | 1/2012 | Shan et al. | |
| 2014/0172423 | A1 | 6/2014 | Dai et al. | |
| 2014/0172953 | A1* | 6/2014 | Blanksteen | H04L 67/22 709/203 |
| 2014/0222436 | A1 | 8/2014 | Binder et al. | |
| 2015/0133082 | A1 | 5/2015 | Broch et al. | |
| 2015/0149171 | A1 | 5/2015 | Goldman et al. | |
| 2016/0042735 | A1* | 2/2016 | Vibbert | G10L 15/1822 704/257 |
| 2019/0019517 | A1* | 1/2019 | Min | G10L 25/51 |

FOREIGN PATENT DOCUMENTS

| | | |
|---|---|---|
| CN | 102612084 A | 7/2012 |
| CN | 103428339 A | 12/2013 |
| CN | 104134442 A | 11/2014 |
| CN | 104535074 A | 4/2015 |
| CN | 104572177 A | 4/2015 |
| CN | 104902430 A | 9/2015 |
| WO | 2015113646 A1 | 8/2015 |

OTHER PUBLICATIONS

Machine Translation and Abstract of Chinese Publication No. CN104572177, Apr. 29, 2015, 6 pages.
Machine Translation and Abstract of Chinese Publication No. CN104902430, Sep. 9, 2015, 8 pages.
Foreign Communication From a Counterpart Application, PCT Application No. PCT/CN2015/091181, English Translation of International Search Report dated May 27, 2016, 3 pages.
Foreign Communication From a Counterpart Application, PCT Application No. PCT/CN2015/091181, English Translation of Written Opinion dated May 27, 2016, 5 pages.
Machine Translation and Abstract of Chinese Publication No. CN101472237, Jul. 1, 2009, 19 pages.
Machine Translation and Abstract of Chinese Publication No. CN103428339, Dec. 4, 2013, 8 pages.
Machine Translation and Abstract of Chinese Publication No. CN104535074, Apr. 22, 2015, 17 pages.
Foreign Communication From a Counterpart Application, Chinese Application No. 201580027959.7, English Translation of International Search Report dated Apr. 10, 2019, 12 pages.
Machine Translation and Abstract of Chinese Publication No. CN102612084, Jul. 25, 2012, 16 pages.
Foreign Communication From a Counterpart Application, European Application No. 15905070.7, Extended European Search Report dated Nov. 29, 2018, 12 pages.

* cited by examiner

VOICE CONTROL PROCESSING METHOD AND APPARATUS

CROSS REFERENCE TO RELATED APPLICATIONS

This application is a U.S. National Stage of International Patent Application No. PCT/CN2015/091181 filed on Sep. 30, 2015, which is hereby incorporated by reference in its entirety.

TECHNICAL FIELD

Embodiments of the present disclosure relate to voice control technologies, and in particular, to a voice control processing method and apparatus.

BACKGROUND

As voice recognition technologies develop, an existing terminal commonly has a voice control function. The voice control function is usually implemented using a voice assistant in a terminal. A user may perform voice control on the terminal using the voice assistant. For example, SIRI in IPHONE 4S or an IPHONE of a higher version is a voice assistant. After starting SIRI, the user may control a mobile phone using voice. In another example, another mobile phone also commonly has a voice assistant function.

Usually, the voice assistant needs to be used when the terminal enables a data service. That is, the voice assistant usually needs to be used online. There are also some voice assistants having an offline function. That is, when the terminal disables the data service, some operations inside the mobile phone can be performed using the voice assistant. For example, when the terminal disables the data service, only the following operations can be performed using the voice assistant calling someone, sending a short message service message to someone, starting a calculator, changing a mobile phone ringtone, and the like. When the terminal disables the data service, if completion of some operation instructions needs network access, the voice assistant cannot identify or execute these operation instructions. For example, when the terminal disables the data service, if the user asks "What is the weather like today?", the voice assistant cannot identify or execute the voice instruction. In this case, the voice assistant feeds back the following. The terminal does not enable the data service, and supports only some specific voice instructions. These specific voice instructions may be displayed on a screen of the terminal. Alternatively, the voice assistant feeds back the following. The voice assistant cannot be used. If the user still wants to use the voice assistant, the user needs to manually enable a data service connection of the terminal. This complicates an operation process.

SUMMARY

Embodiments of the present disclosure provide a voice control processing method and apparatus such that when receiving a voice instruction, a terminal with a disabled data service can execute the voice instruction more conveniently.

According to a first aspect, an embodiment of the present disclosure provides a voice control processing method, including enabling, by a terminal in a data service disabled state, a data service after the terminal receives a voice instruction using a first application, where the first application is an application program used for voice control in the terminal, prohibiting, by the terminal, another application other than the first application in the terminal from using the data service, and controlling, by the terminal, the first application to execute the voice instruction using the data service, after the terminal enables the data service. The terminal in a data service disabled state receives the voice instruction. Then, the terminal enables the data service and prohibits another application from using the data service in order to conveniently use voice control, and effectively control a use status of data traffic.

Optionally, enabling, by a terminal, a data service includes automatically enabling, by the terminal, the data service. The terminal automatically enables the data service such that a user does not need to perform a manual operation.

Optionally, enabling, by a terminal, a data service includes obtaining, by the terminal, data traffic required for executing the voice instruction, and automatically enabling, by the terminal, the data service if the required data traffic is less than or equal to a first preset threshold, or if a difference between remaining traffic of the terminal and the required data traffic (or a ratio of remaining traffic of the terminal to the required data traffic) is greater than or equal to a second preset threshold, or sending, by the terminal, a prompt indicating whether to enable the data service, if the required data traffic is greater than the first preset threshold, or if a difference between remaining traffic of the terminal and the required data traffic (or a ratio of remaining traffic of the terminal to the required data traffic) is less than the second preset threshold, and enabling, by the terminal, the data service after receiving an indication for enabling the data service. The terminal determines, according to a value of the data traffic required for executing the voice instruction, whether to enable the data service. When the required data traffic is relatively small, the terminal automatically enables the data service. When the required data traffic is relatively large, the terminal enables the data service after user confirmation. Therefore, the terminal facilitates using of a voice control function by the user, and controls data traffic use.

Optionally, enabling, by a terminal, a data service includes obtaining, by the terminal, a service type corresponding to the voice instruction, and if the service type is a type in which the data service is allowed to be enabled, automatically enabling, by the terminal, the data service, or if the service type is not a type in which the data service is allowed to be enabled, sending, by the terminal, a prompt indicating whether to enable the data service, and enabling, by the terminal, the data service after receiving an indication for enabling the data service. The terminal determines, according to the service type corresponding to the voice instruction, whether to enable the data service such that the terminal can facilitate, based on a presetting, using of a specific type of application by the user using a voice control function.

Optionally, controlling, by the terminal, the first application to execute the voice instruction using the data service, after the terminal enables the data service includes after the terminal enables the data service, obtaining, by the terminal using the data service, data traffic required for executing the voice instruction, and controlling, by the terminal, the first application to execute the voice instruction using the data service, if the required data traffic is less than or equal to a first preset threshold, or if a difference between remaining traffic of the terminal and the required data traffic (or a ratio of remaining traffic of the terminal to the required data traffic) is greater than or equal to a second preset threshold, or sending, by the terminal, a prompt indicating whether to execute the voice instruction, if the required data traffic is greater than the first preset threshold, or if a difference between remaining traffic of the terminal and the required data traffic (or a ratio of remaining traffic of the terminal to the required data traffic) is less than the second preset threshold, and controlling, by the terminal after receiving an indication for executing the voice instruction, the first application to execute the voice instruction using the data service. After enabling the data service, the terminal may further determine, based on potentially to-be-used data traffic, whether to execute the voice instruction in order to further control data traffic use.

Optionally, controlling, by the terminal, the first application to execute the voice instruction using the data service, after the terminal enables the data service includes, after the terminal enables the data service, obtaining, by the terminal, a service type corresponding to the voice instruction, and if the service type is a type in which the data service is allowed to be enabled, controlling, by the terminal, the first application to execute the voice instruction using the data service, or if the service type is not a type in which the data service is allowed to be enabled, sending, by the terminal, a prompt indicating whether to execute the voice instruction, and controlling, by the terminal after receiving an indication for executing the voice instruction, the first application to execute the voice instruction using the data service. After enabling the data service, the terminal may further determine, based on the service type corresponding to the voice instruction, whether to execute the voice instruction such that the terminal can facilitate, based on a presetting, using of a specific type of application by the user using a voice control function.

Optionally, after the terminal in a data service disabled state receives the voice instruction using the first application, the method further includes storing, by the terminal, the voice instruction. The terminal may cache the voice instruction in advance. After enabling the data service, the terminal does not need to receive a voice instruction from the user again, but may directly send the voice instruction to a network side in order to simplify an operation.

Optionally, the method further includes before the terminal enables the data service, performing, by the terminal, voiceprint recognition on the voice instruction, and if a voice print of the voice instruction is identified as a voice print of a user of the terminal, performing a step of enabling the data service by the terminal.

Optionally, after controlling, by the terminal, the first application to execute the voice instruction using the data service, the method further includes disabling, by the terminal, the data service after a preset time period.

Optionally, the method further includes starting, by the terminal, the first application before the terminal in a data service disabled state receives the voice instruction using the first application, where the terminal is in a screen-off state when the terminal starts the first application, the terminal receives the voice instruction, the terminal enables the data service, or the first application executes the voice instruction using the data service. The terminal is in a screen-off state in a process of executing the voice instruction in order to reduce power consumption.

Optionally, the method further includes starting, by the terminal, the first application before the terminal in a data service disabled state receives the voice instruction using the first application, where the terminal is in a screen-off state when the terminal starts the first application, and in a process in which the terminal controls the first application to execute the voice instruction using the data service, if the terminal can respond to the voice instruction by means of voice, the terminal is in a screen-off state in the process in which the first application executes the voice instruction, or if the terminal cannot respond to the voice instruction by means of voice, the terminal is in a screen-on state in the process in which the first application executes the voice instruction.

According to a second aspect, an embodiment of the present disclosure provides a voice control processing method, including receiving, by a terminal in a data service disabled state, an indication for starting a first application, where the first application is an application program used for voice control in the terminal, enabling, by the terminal, a data service after the terminal receives the indication for starting the first application, starting, by the terminal, the first application after the terminal receives the indication for starting the first application, and prohibiting, by the terminal, another application other than the first application in the terminal from using the data service. If the terminal in a data service disabled state receives an indication for starting the first application, the terminal automatically enables the data service, and prohibits another application from using the data service in order to conveniently use voice control, and effectively control a use status of data traffic.

Optionally, the method further includes, after the terminal starts the first application, receiving, by the terminal, a voice instruction using the first application, obtaining, by the terminal, data traffic required for executing the voice instruction, and controlling, by the terminal, the first application to execute the voice instruction using the data service, if the required data traffic is less than or equal to a first preset threshold, or if a difference between remaining traffic of the terminal and the required data traffic (or a ratio of remaining traffic of the terminal to the required data traffic) is greater than or equal to a second preset threshold, or sending, by the terminal, a prompt indicating whether to execute the voice instruction, if the required data traffic is greater than the first preset threshold, or if a difference between remaining traffic of the terminal and the required data traffic (or a ratio of remaining traffic of the terminal to the required data traffic) is less than the second preset threshold, and controlling, by the terminal after receiving an indication for executing the voice instruction, the first application to execute the voice instruction using the data service. After enabling the data service, the terminal may further determine, based on potentially to-be-used data traffic, whether to execute the voice instruction in order to further control data traffic use.

Optionally, the method further includes, after the terminal starts the first application, receiving, by the terminal, a voice instruction using the first application, obtaining, by the terminal, a service type corresponding to the voice instruction, and if the service type is a type in which the data service is allowed to be enabled, controlling, by the terminal, the first application to execute the voice instruction using the data service, or if the service type is not a type in which the data service is allowed to be enabled, sending, by the terminal, a prompt indicating whether to execute the voice instruction, and controlling, by the terminal after receiving an indication for executing the voice instruction, the first application to execute the voice instruction using the data service. After enabling the data service, the terminal may further determine, based on the service type corresponding to the voice instruction, whether to execute the voice instruction such that the terminal can facilitate, based on a presetting, using of a specific type of application by the user using a voice control function.

According to a third aspect, an embodiment of the present disclosure provides a voice control processing method, including enabling, by a terminal in a data service disabled state, a data service after the terminal receives a voice instruction using a first application, where the first application is an application program used for voice control in the terminal, and the voice instruction includes an instruction for using at least one second application in the terminal, prohibiting, by the terminal, another application other than the first application and the at least one second application in the terminal from using the data service, and controlling, by the terminal, the second application to use the data service, after the terminal enables the data service. The terminal in a data service disabled state receives the voice instruction. When the voice instruction is used to instruct to use the second application, the terminal enables the data service, allows the second application to use the data service, and prohibits another application from using the data service in order to conveniently use voice control, and effectively control a use status of data traffic.

Optionally, the method further includes prohibiting, by the terminal, the first application from using the data service. Further, the terminal may further prohibit the first application from using the data service, that is, allows only the second application to use the data service.

According to a fourth aspect, an embodiment of the present disclosure provides a voice control processing apparatus, which is included in a terminal. The voice control processing apparatus has a function for implementing a behavior of the terminal in each method of the first aspect. The function may be implemented using hardware, or may be implemented by executing corresponding software by the hardware. The hardware or the software includes one or more modules corresponding to the foregoing function.

According to a fifth aspect, an embodiment of the present disclosure provides a voice control processing apparatus, which is included in a terminal. The voice control processing apparatus has a function for implementing a behavior of the terminal in each method of the second aspect. The function may be implemented using hardware, or may be implemented by executing corresponding software by the hardware. The hardware or the software includes one or more modules corresponding to the foregoing function.

According to a sixth aspect, an embodiment of the present disclosure provides a voice control processing apparatus, which is included in a terminal. The voice control processing apparatus has a function for implementing a behavior of the terminal in each method of the third aspect. The function may be implemented using hardware, or may be implemented by executing corresponding software by the hardware. The hardware or the software includes one or more modules corresponding to the foregoing function.

The embodiments of the present disclosure further provide a computer storage medium that is configured to store a computer software instruction used by the terminal in any foregoing aspect, including a program designed for executing the foregoing aspect.

A terminal in a data service disabled state receives a voice instruction. Then, the terminal enables a data service and prohibits another application from using the data service in order to conveniently use voice control, and effectively control a use status of data traffic.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

The following clearly and completely describes the technical solutions in the embodiments of the present disclosure with reference to the accompanying drawings in the embodiments of the present disclosure. The described embodiments are merely some but not all of the embodiments of the present disclosure. All other embodiments obtained by a person of ordinary skill in the art based on the embodiments of the present disclosure without creative efforts shall fall within the protection scope of the present disclosure.

A voice control processing method provided in each embodiment of the present disclosure is applied to a terminal. The terminal may perform data service interaction with an external network. The terminal may be, for example, a mobile phone, a tablet computer (e.g. Tablet Personal Computer), a laptop computer, a personal digital assistant (PDA), a set top box, a navigation apparatus, a mobile Internet device (MID), or a wearable device.

The terminal in each embodiment of the present disclosure may enable a data service, or may disable a data service. The enabling a data service is equivalent to enabling (enabled) a data service, and the disabling a data service is equivalent to disabling (disabled) a data service. When the terminal is in a data service enabled state, the terminal can perform data service interaction with the external network.

That is, the terminal can access a network in this case. When the terminal is in a data service disabled state, the terminal cannot perform data service interaction with the external network. That is, the terminal cannot access a network in this case. The data service in each embodiment of the present disclosure is mainly a mobile data service, for example, a network access service provided in mobile communications technologies such as a general packet radio service (GPRS), Enhanced Data rates for Global System for Mobile Communications (GSM) Evolution (EDGE), Time Division-Synchronous Code Division Multiple Access (TD-SCDMA), Wideband Code Division Multiple Access (WCDMA), Code Division Multiple Access (CDMA), High Speed Downlink Packet Access (HSDPA), and Long Term Evolution (LTE), or may be a network access service provided by a wireless local area network (WLAN).

The terminal in each embodiment of the present disclosure may include multiple application programs that are used to implement different functions, for example, a social networking application program, a game application program, and a shopping application program.

Figure 1:
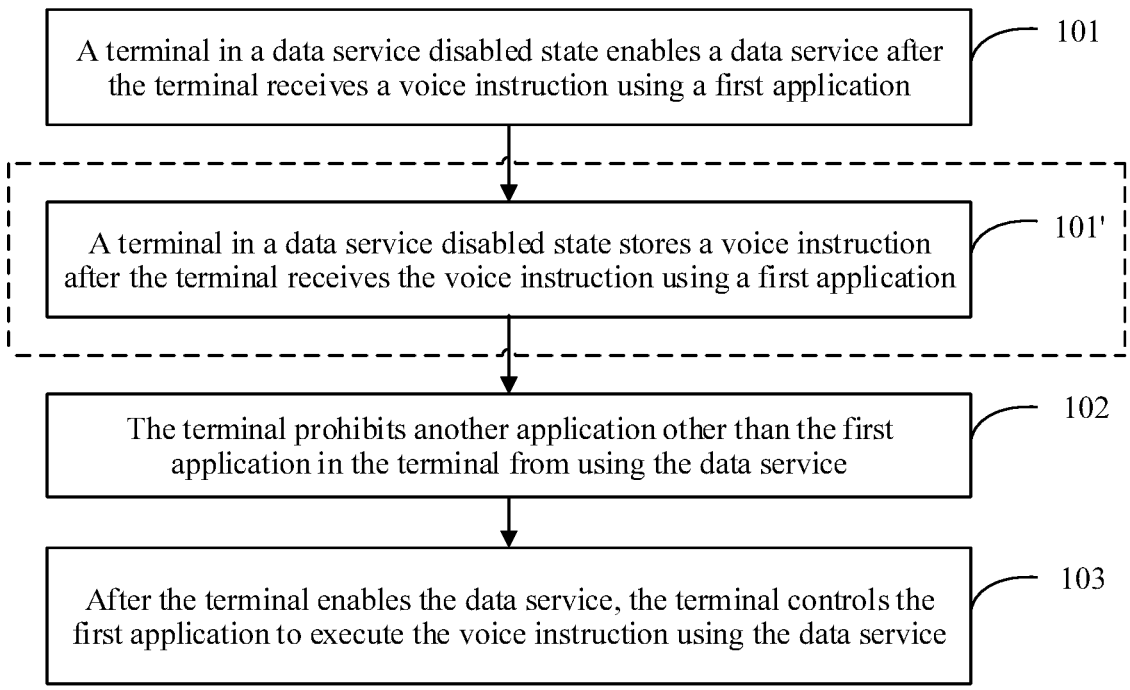
FIG. 1 is a schematic flowchart of a voice control processing method according to an embodiment of the present disclosure.

FIG. 1 is a schematic flowchart of a voice control processing method according to an embodiment of the present disclosure. As shown in FIG. 1, the method includes the following steps.

Step 101: A terminal in a data service disabled state enables a data service after the terminal receives a voice instruction using a first application. The first application is an application program used for voice control in the terminal.

The first application in each embodiment of the present disclosure is a voice assistant or a similar application program, for example, a voice assistant (SIRI) in IPHONE. After the voice assistant is started, a user may control the terminal by means of voice. The user may manually start the voice assistant, or the voice assistant may be started by means of voice. For example, when a mobile phone with a black screen wakeup function is in a standby state, a voice assistant in the mobile phone may be started using a specific voice wakeup keyword such as "Hey SIRI" or "OK GOOGLE". After the voice assistant is started, a voice made by the user may be received. Alternatively, when the voice assistant is started, a voice instruction sent by the user may be simultaneously received. For example, when the user asks a question with a wakeup keyword, such as "Hey SIRI, what will the weather be like tomorrow?", SIRI is woken up, and also receives a voice instruction "What will the weather be like tomorrow?". It should be noted that the voice instruction in each embodiment of the present disclosure is an instruction that instructs the voice assistant to perform an operation, and does not include the foregoing voice wakeup keyword. A voice wakeup keyword, for example, "Hey SIRI" or "OK GOOGLE", is used to wake up the voice assistant, and does not belong to the voice instruction in each embodiment of the present disclosure.

The method provided in this embodiment of the present disclosure is mainly applied to a case in which the terminal in a data service disabled state receives a voice instruction.

When the terminal is in a data service disabled state, after the first application is started (or activated), the terminal may receive, using the first application, a voice instruction sent by the user. After receiving the voice instruction, the terminal may enable the data service.

There may be multiple scenarios in which the terminal enables the data service. For example, the terminal may directly enable the data service automatically. Alternatively, the terminal may first obtain data traffic required for executing the voice instruction, and the terminal enables the data service only when the required data traffic is less than a preset value, or the terminal does not enable the data service when the required data traffic is not less than a preset value. Alternatively, the terminal may obtain a service type corresponding to the voice instruction, and when the service type is a type in which the data service is allowed to be enabled, the terminal automatically enables the data service, or when the service type is not a type in which the data service is allowed to be enabled, the terminal enables the data service only after receiving an indication for enabling the data service. Alternatively, the terminal obtains voiceprint information of the voice instruction, and the terminal enables the data service only when the voiceprint information belongs to an owner of the terminal, or the terminal enables the data service after data traffic determining.

It should be noted that, after the terminal in a data service disabled state receives the voice instruction, the terminal may first determine whether the voice instruction can be currently executed. That is, the terminal first determines whether execution of the voice instruction requires data service interaction with an external network. When execution of the voice instruction requires the data service interaction with the external network, the terminal may enable the data service.

The terminal may first determine whether the terminal is in a data service disabled state. If the terminal is in a data service disabled state, the terminal further determines whether the received voice instruction needs to be executed using the data service. If the received voice instruction cannot be executed without using the data service, the terminal may enable the data service. Alternatively, the terminal may first determine whether the received voice instruction needs to be executed using the data service. If the received voice instruction cannot be executed without using the data service, the terminal further determines whether the terminal is in a data service disabled state. If the terminal is in a data service disabled state, the terminal may enable the data service. An execution sequence of an action that the terminal determines whether the terminal is in a data service disabled state and an action that the terminal determines whether the received voice instruction needs to be executed using the data service is not limited in this embodiment.

If the terminal with a disabled data service cannot identify the voice instruction, the terminal learns that the voice instruction cannot be executed without using the data service. Alternatively, the terminal pre-stores information about a control instruction that needs to use the data service and a control instruction that does not need the data service. Then, the terminal may determine whether the voice instruction needs to be executed using the data service. For example, when the terminal receives a voice "What will the weather be like tomorrow?", the terminal may fail to identify the voice, and the terminal may enable the data service, or the terminal identifies that execution of an operation corresponding to the voice requires the data service to be enabled.

It should be noted that, after the voice instruction is received, if the terminal determines that the voice instruction can be executed (that is, when execution of the voice instruction does not require the data service interaction with the external network), the terminal may directly execute the voice instruction. For example, when the terminal receives a voice "Turn on BLUETOOTH", the terminal directly performs an operation of turning on the BLUETOOTH.

Step 102: The terminal prohibits another application other than the first application in the terminal from using the data service.

The terminal enables the data service such that the first application can use the data service. In addition, the terminal prohibits another application from using the data service. The other application is an application installed in the terminal other than the first application.

Some applications in the terminal automatically use the data service in the background. Therefore, the user may disable the data service of the terminal when the user intends to control data traffic use. To prevent another application from randomly using the data service and to enable the voice assistant to access a network, after enabling the data service, the terminal may prohibit another application from using the data service.

An execution sequence of step 101 and step 102 is not limited in this embodiment. That is, step 102 may be performed before or after the data service is enabled, or the two steps may be simultaneously performed, or the two steps may be implemented using one action or one step.

The terminal may prohibit, in multiple manners, another application from using the data service. For example, manner 1 includes the following. The terminal turns off a data switch for another application. Further, the terminal may prohibit all other applications in a network access application control option in a system setting, and start only the voice assistant application. That is, only the voice assistant is allowed to use the data traffic, and the other applications are in an offline state. Actually, prohibiting an application from using a mobile network is equivalent to canceling mobile data network access permission of the application. In an example of an ANDROID system, access permission of various objects (including various types of data, a sensor, telephone number dialing, information sending, control of another application program, and the like on a device) is classified in detail in an ANDROID framework, and a series of "ANDROID. Permission.*" objects are listed. Before running, an application program notifies the ANDROID system of permission to be used by the application program. Method 2 includes the following. The terminal allocates, only to the voice assistant application, a port number used for network access. Further, after a process of the voice assistant is started, a pair of Transmission Control Protocol (TCP)/User datagram protocol (UDP) port numbers is allocated only to an identifier of this process of the voice assistant. Then, only the pair of port numbers is allowed for receiving and sending data service. That is, the network is enabled only for the voice assistant.

Step 103: After the terminal enables the data service, the terminal controls the first application to execute the voice instruction using the data service.

After enabling the data service, the terminal controls the first application to execute the voice instruction. The first application of the terminal sends the voice instruction to a network side using the data service, then receives a response returned by the network side, and feeds back the response to the user. For example, the voice instruction sent by the user is "What will the weather be like tomorrow?". After obtaining the voice instruction, the first application requests weather of tomorrow from the network side using the data service. Then, the first application receives a weather status of today that is returned by the network side. Finally, the terminal displays the weather status of tomorrow by means of word, voice, or picture in order to provide the weather status for the user.

Optionally, in a specific implementation, the method may further include the following step.

Step 101': A terminal in a data service disabled state stores a voice instruction after the terminal receives the voice instruction using a first application.

After the terminal in a data service disabled state receives the voice instruction, if the terminal determines that the voice instruction cannot be currently executed (that is, execution of the voice instruction requires data service interaction with an external network), the terminal stores the voice instruction.

An execution sequence of an action that the terminal determines whether the terminal is in a data service disabled state and an action that the terminal determines whether the received voice instruction needs to be executed using the data service is not limited in this embodiment. When the terminal learns that the terminal is in a data service disabled state, and the received voice instruction cannot be executed without using the data service, the terminal stores the voice instruction.

An execution sequence of step 101 and step 101' is not limited in this embodiment. That is, after the terminal in a data service disabled state receives the voice instruction using the first application, the terminal may first enable the data service, or may first store the voice instruction.

It should be noted that, after the voice instruction is received, if the terminal determines that the voice instruction can be executed (that is, when execution of the voice instruction does not require the data service interaction with the external network), the terminal may directly execute the voice instruction, and does not need to cache the voice instruction. For example, when the terminal receives a voice "Turn on BLUETOOTH", the terminal may directly perform an operation of turning on the BLUETOOTH, and does not need to cache the voice instruction.

In this embodiment of the present disclosure, a terminal in a data service disabled state enables a data service after the terminal receives a voice instruction using a first application. After the data service is enabled, the first application in the terminal may execute the voice instruction using the data service, and the terminal further prohibits another application other than the first application from using the data service. The terminal in a data service disabled state receives the voice instruction. Then, the terminal enables the data service and prohibits another application from using the data service in order to conveniently use voice control, and effectively control a use status of data traffic.

FIG. 2A and FIG. 2B to FIG. 2E and FIG. 2F are schematic flowcharts of another voice control processing method according to an embodiment of the present disclosure. As shown in FIG. 2A and FIG. 2B to FIG. 2E and FIG. 2F, based on the embodiment shown in FIG. 1, the method includes the following steps.

Step 201: A terminal in a data service disabled state receives a voice instruction using a first application. For descriptions of this step, refer to the description in step 101 in the embodiment shown in FIG. 1.

Step 202: The terminal stores the voice instruction.

The terminal may first determine whether the terminal is in a data service disabled state. If the terminal is in a data service disabled state, the terminal further determines whether the received voice instruction needs to be executed using the data service. If the received voice instruction cannot be executed without using the data service, the terminal stores the voice instruction. Alternatively, the terminal may first determine whether the received voice instruction needs to be executed using the data service. If the received voice instruction cannot be executed without using the data service, the terminal further determines whether the terminal is in a data service disabled state. If the terminal is in a data service disabled state, the terminal may store the voice instruction. The terminal may cache the voice instruction in advance. After enabling the data service, the terminal does not need to receive a voice instruction from a user again, but may directly send the voice instruction to a network side in order to simplify an operation.

After step 202, a step of performing voiceprint recognition may be further included, that is, step 203.

Step 203: The terminal performs voiceprint recognition on the voice instruction. If a voice print of the voice instruction is identified as a voice print of a user of the terminal, step 204a, step 204b, or step 204c is performed. Alternatively, if a voice print of the voice instruction is identified as a voice print other than a voice print of a user of the terminal, that is, a user that currently uses the terminal is not an owner of the terminal, step 211 may be performed.

After the first application of the terminal receives the voice instruction, that is, after the first application obtains a voice sent by the user, the terminal performs voiceprint recognition on the voice instruction. By adding the voiceprint recognition, another user (not the owner of the terminal) may be prohibited from randomly using a voice control function.

The terminal may pre-store voiceprint information of the user. In a data service disabled state, when the terminal receives a voice instruction, the terminal may first obtain voiceprint information corresponding to the voice instruction, and then match the obtained voiceprint information with the pre-stored voiceprint information. If the obtained voiceprint information is consistent with the pre-stored voiceprint information, the obtained voiceprint information is identified as the voiceprint information of the user of the terminal, or if the obtained voiceprint information is inconsistent with the pre-stored voiceprint information, the obtained voiceprint information is not identified as the voiceprint information of the user of the terminal. If the voiceprint information of the voice instruction is identified as the voiceprint information of the user of the terminal, step 204a, step 204b, or step 204c is performed.

The terminal may first determine whether the terminal is in a data service disabled state. If the terminal is in a data service disabled state, the terminal further determines whether the received voice instruction needs to be executed using the data service. If the received voice instruction cannot be executed without using the data service, the terminal performs voiceprint recognition on the voice instruction. Alternatively, the terminal may first determine whether the received voice instruction needs to be executed using the data service. If the received voice instruction cannot be executed without using the data service, the terminal further determines whether the terminal is in a data service disabled state. If the terminal is in a data service disabled state, the terminal performs voiceprint recognition on the voice instruction.

Step 211: The terminal verifies an identity of a user. If the verification succeeds, step 204a, step 204b, or step 204c is performed, or if the verification fails, the method is terminated and the following steps are not performed.

There may be multiple manners in which the terminal verifies the identity of the user. For example, manner 1 includes the following. The terminal prompts "whether to turn on a data switch". If the terminal receives a reply (by means of voiceprint recognition) from the owner of the terminal to confirm turning on of the data switch, or the terminal receives a password the same as a preset password, the verification succeeds. Manner 2 includes the following.

The terminal prompts "whether to keep executing the voice assistant". If the terminal receives a reply (by means of voiceprint recognition) from the owner of the terminal to confirm that the voice assistant keeps to be executed, or the terminal receives a password the same as a preset password, the verification succeeds.

An example in which step 203 is performed after step 202 is described in this embodiment. However, a sequence of step 202 and step 203 is not limited in this embodiment. Step 203 may be performed before step 202, or step 202 and step 203 may be simultaneously performed. After step 203 is performed, step 204a, step 204b, or step 204c is performed according to a recognition result.

After step 203, the terminal may automatically enable the data service, may obtain data traffic required for executing the voice instruction, and then determine, according to the required data traffic, whether to enable the data service, or may further obtain a service type corresponding to the voice instruction, and then determine, according to the service type, whether to enable the data service. In the following, step 204a to step 209a in FIG. 2A and FIG. 2B are used to describe a solution that the terminal automatically enables the data service, step 204b to step 209b in FIG. 2C and FIG. 2D are used to describe a solution that the data service is enabled according to traffic, and step 204c to step 209c in FIG. 2E and FIG. 2F are used to describe a solution that the data service is enabled according to the service type.

Figure 2A:
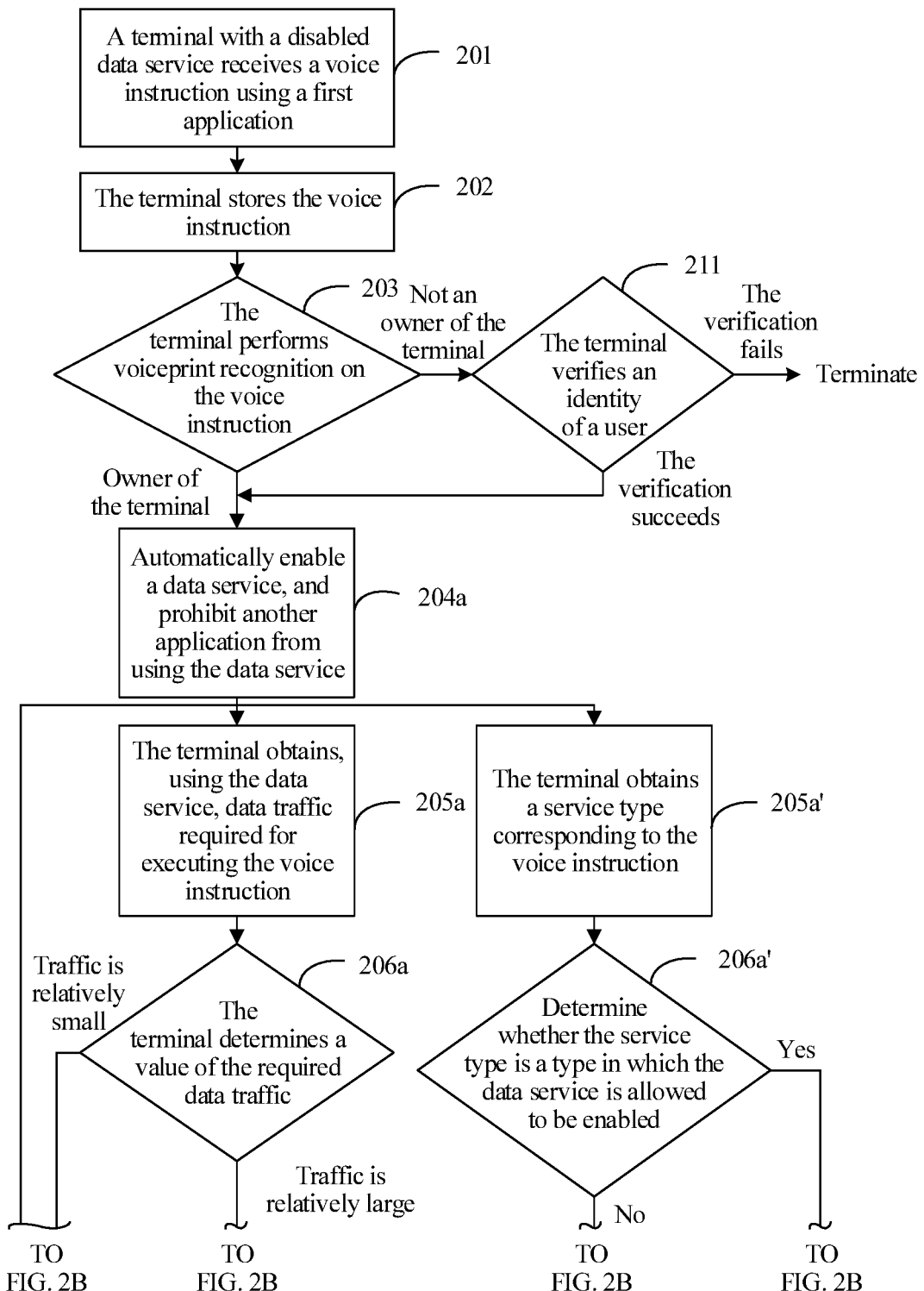
FIGS. 2A, 2B, 2C, 2D, 2E and 2F are schematic flowcharts of another voice control processing method according to an embodiment of the present disclosure.
Figure 2B:
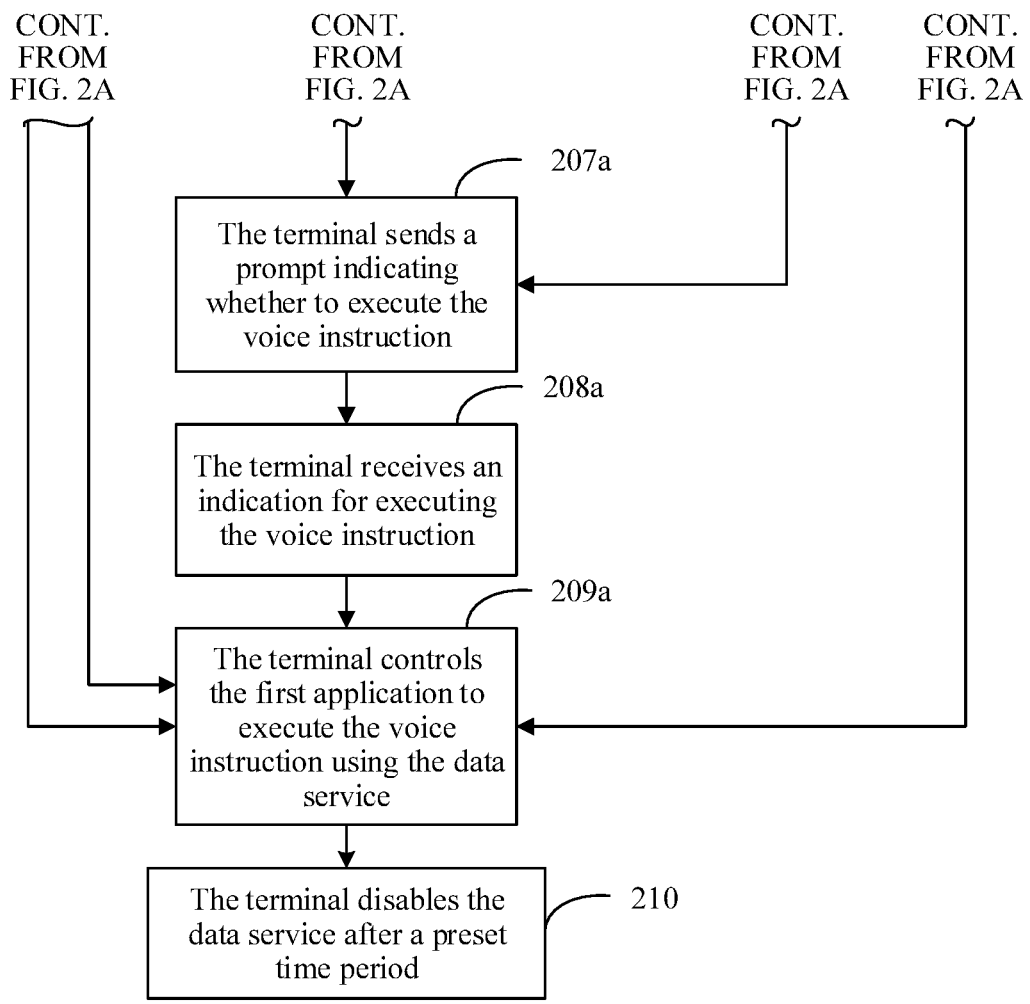
Figure 2C:
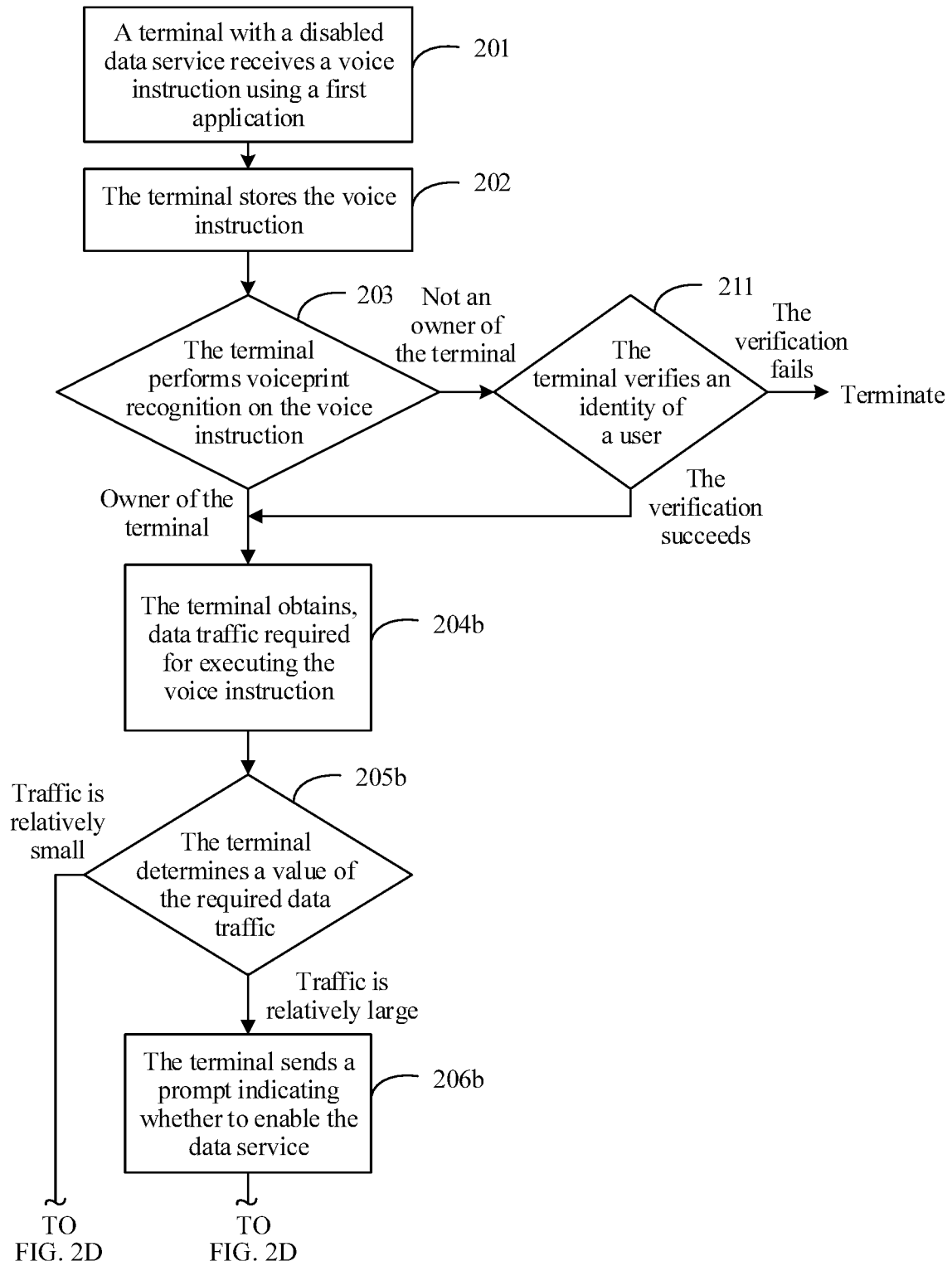
Figure 2D:
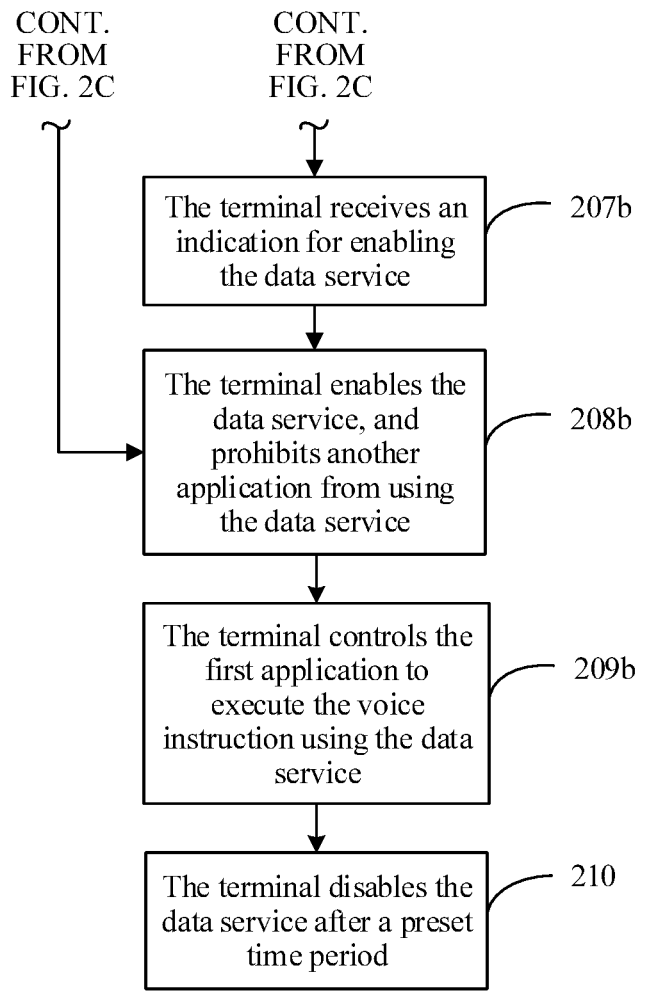
Figure 2E:
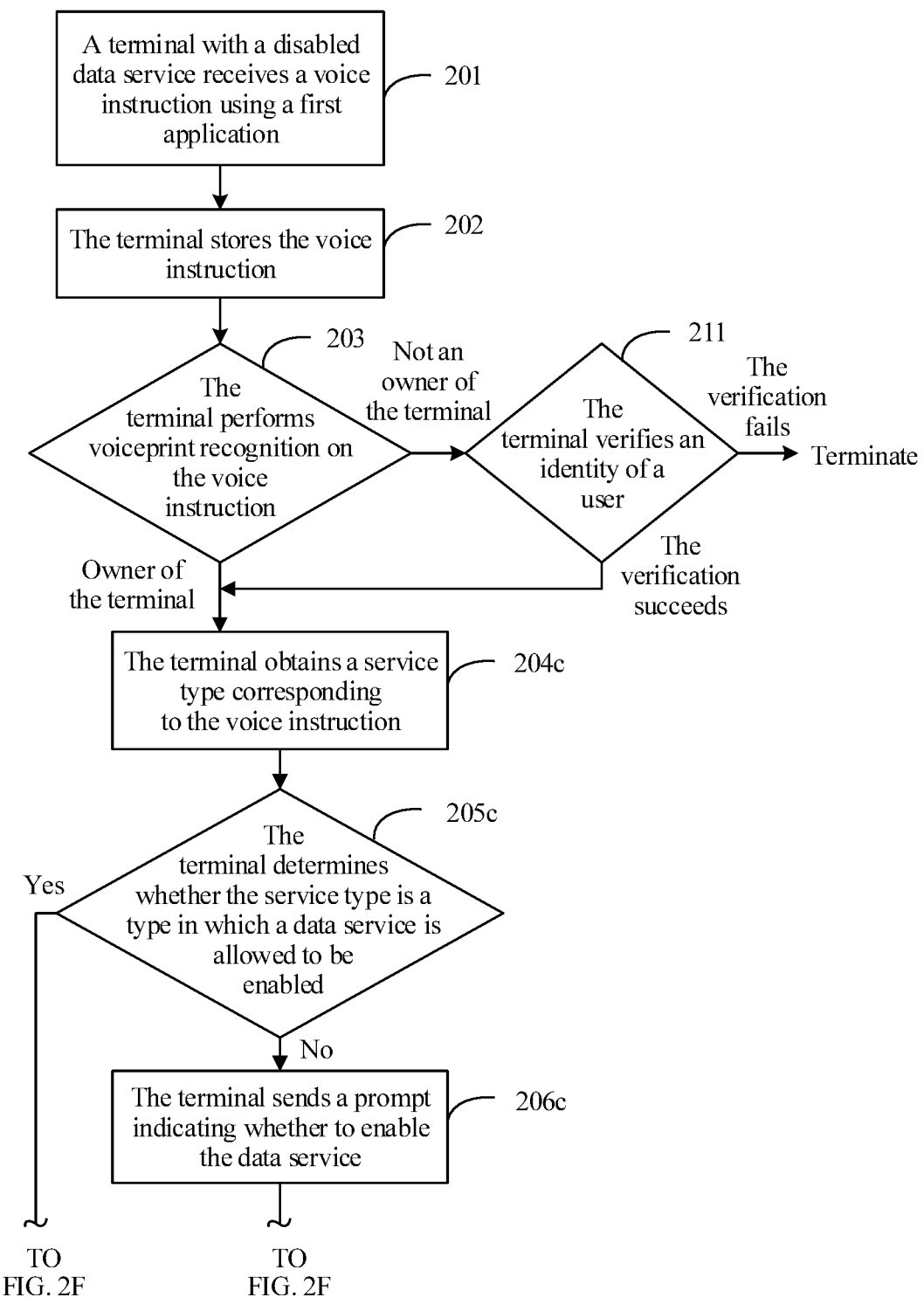
Figure 2F:
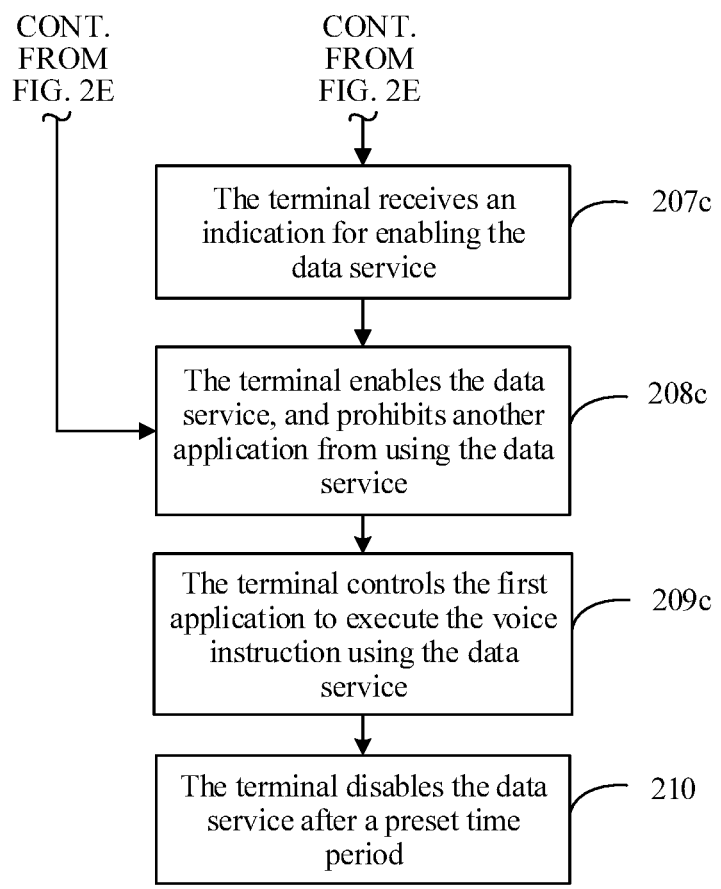

As shown in FIG. 2A and FIG. 2B, after the voice print of the voice instruction is determined as the voice print of the user of the terminal in step 203, step 204a is performed.

Step 204a: The terminal automatically enables a data service, and prohibits another application other than the first application from using the data service.

The terminal may enable the data service by turning on a data switch. The terminal automatically enables the data service such that a user does not need to perform a manual operation. For a process in which the terminal prohibits another application other than the first application from using the data service, refer to the description in step 102.

After enabling the data service, the terminal may execute the voice instruction, that is, the terminal performs step 209a. Alternatively, after enabling the data service, the terminal may determine, according to the data traffic required for executing the voice instruction, whether to execute the voice instruction, that is, the terminal may perform step 205a. Alternatively, after enabling the data service, the terminal may determine, according to the service type corresponding to the voice instruction, whether to execute the voice instruction, that is, the terminal may perform step 205a'.

Step 205a: The terminal obtains, using the data service, data traffic required for executing the voice instruction.

After enabling the data service, the terminal may send a request to a server of the network side, to obtain the data traffic required for executing the voice instruction. After receiving the request, the server may query, according to information locally stored by the server, the data traffic required for executing the voice instruction, and return a query result to the terminal. Alternatively, after receiving the request, the server may preload content corresponding to the voice instruction, collect statistics about the data traffic required for executing the voice instruction, and then send a result obtained after the statistics collection to the terminal. Further, for a process in which the terminal obtains, from the network side, the data traffic required for executing the voice instruction, refer to descriptions in the following FIG. 2C and FIG. 2D.

The required data traffic in each embodiment of the present disclosure may be exact data traffic that needs to be used, or may be an estimated value. The required data traffic may be obtained by means of estimation according to a historical value, or may be a preset estimated value, or may be further obtained by means of actual measurement of the network side.

Step 206a: The terminal determines a value of the required data traffic. If the required data traffic is relatively small, step 209a is performed, or if the required data traffic is relatively large, step 207a is performed. Further, the terminal compares the required data traffic with a preset threshold, or the terminal compares remaining traffic with the required data traffic. When the required data traffic is less than or equal to a first preset threshold, or when a difference between the remaining traffic of the terminal and the required data traffic (or a ratio of the remaining traffic of the terminal to the required data traffic) is greater than or equal to a second preset threshold, step 209a is performed. When the required data traffic is greater than a first preset threshold, or when a difference between the remaining traffic of the terminal and the required data traffic (or a ratio of the remaining traffic of the terminal to the required data traffic) is less than a second preset threshold, step 207a is performed.

The terminal may preset a threshold (the first preset threshold). When the data traffic required for executing the voice instruction is relatively small (less than or equal to the first preset threshold), the terminal may execute the voice instruction. When the data traffic required for executing the voice instruction is relatively large (greater than the first preset threshold), the terminal may quit executing the voice instruction, or may make a request to the user, and the terminal executes the voice instruction after the request is allowed (referring to step 207a and step 208a).

Usually, when the user uses the terminal, data traffic is charged at a flat monthly fee. That is, there is specific data traffic (referred to as total traffic) that can be used for one month or a time period. For example, there is 1 gigabyte (GB) data traffic for one month. The remaining traffic is obtained by subtracting used data traffic from the total traffic. The terminal may preset another threshold (the second preset threshold). When the difference between the remaining traffic and the data traffic required for executing the voice instruction (or the ratio of the remaining traffic to the data traffic required for executing the voice instruction) is greater than or equal to the second preset threshold, the terminal may execute the voice instruction, or when the ratio of the remaining traffic to the data traffic required for executing the voice instruction is greater than or equal to the second preset threshold, the terminal may execute the voice instruction.

Step 207a: The terminal sends a prompt indicating whether to execute the voice instruction.

The terminal may send the prompt in multiple manners. For example, the terminal notifies the user of currently required traffic by means of voice playing or by popping up words on a screen, and requests the user to make a choice. After the terminal sends the prompt, the user may choose whether to execute the voice instruction, and notifies the terminal of a selection result by means of voice or by entering the result on the screen.

Step 208a: The terminal receives an indication for executing the voice instruction, and then performs step 209a.

After the user chooses to execute the voice instruction, the terminal receives the indication, and then performs a subsequent step. If the user chooses not to execute the voice instruction, the terminal terminates use of the first application, that is, terminates a voice control process.

Step 209a: The terminal controls the first application to execute the voice instruction using the data service.

It should be noted that, if the terminal sends the voice instruction to the server in step 205a, in step 209a, the terminal may only instruct the server to execute the voice instruction, and receive information returned by the server. If the terminal does not send the voice instruction to the server in step 205a, in step 209a, the terminal sends the voice instruction to the server, and receives information returned by the server.

After enabling the data service, the terminal may further determine, based on potentially to-be-used data traffic, whether to execute the voice instruction in order to further control data traffic use. In another implementation, the foregoing step 205a to step 206a may be replaced with the following step 205a' to step 206a'.

Step 205a': The terminal obtains a service type corresponding to the voice instruction.

Different voice instructions may be corresponding to different service types. For example, an instruction for searching for a picture online corresponds to a picture searching type, and an instruction for translating a sentence corresponds to a translation type. There are still other types, for example, weather query and map navigation.

Step 206a': The terminal determines whether the service type corresponding to the voice instruction is a type in which the data service is allowed to be enabled. If the service type is a type in which the data service is allowed to be enabled, step 209a is performed, or if the service type is not a type in which the data service is allowed to be enabled, step 207a is performed.

The terminal may pre-store a type in which the data service is allowed to be enabled, and may also pre-store a type in which the data service is not allowed to be enabled. After obtaining the service type corresponding to the voice instruction, the terminal may determine, according to pre-stored content, whether to allow the data service to be enabled for the voice instruction. If the data service is allowed to be enabled for the voice instruction, the data service is enabled, that is, step 209a is performed. If the data service is not allowed to be enabled for the voice instruction, step 207a is performed. There may be multiple rules for setting a service type in which the data service is allowed to be enabled and a service type in which the data service is not allowed to be enabled. For example, a service type that may use relatively large data traffic may be set to a service type in which the data service is not allowed to be enabled, and a service type that may use relatively small data traffic may be set to a service type in which the data service is allowed to be enabled. Alternatively, a service type with a relatively low priority may be set to a service type in which the data service is not allowed to be enabled, and a service type with a relatively high priority may be set to a service type in which the data service is allowed to be enabled. The terminal may set, according to a preset rule, a service type in which the data service is allowed to be enabled, or a service type in which the data service is allowed to be enabled is configured for the terminal before delivery or after delivery.

After enabling the data service, the terminal may further determine, based on the service type corresponding to the voice instruction, whether to execute the voice instruction such that the terminal can facilitate, based on a presetting, using of a specific type of application by the user using a voice control function.

As shown in FIG. 2C and FIG. 2D, after the voice print of the voice instruction is determined as the voice print of the user of the terminal in step 203, step 204a may be not performed, but the following step 204b to step 209b may be performed.

Step 204b: The terminal obtains data traffic required for executing the voice instruction.

The terminal may locally pre-store data traffic required by various voice instructions. After the terminal receives a voice instruction, the terminal may locally query data traffic required by the voice instruction. Further, the terminal may store a relationship table. The relationship table includes various voice instructions and data traffic corresponding to the voice instructions. The relationship table may be pre-stored in the terminal. Alternatively, the relationship table may be generated according to a use history of the first application. When executing a voice instruction using the data service, the terminal records, in the relationship table, data traffic required by the voice instruction in order to facilitate subsequent query use.

Step 205b: The terminal determines a value of the required data traffic. If the required data traffic is relatively small, step 208b is performed, that is, the terminal may automatically enable the data service, or if the required data traffic is relatively large, step 206b is performed. Further, the terminal compares the required data traffic with a preset threshold, or the terminal compares remaining traffic with the required data traffic. When the required data traffic is less than or equal to a first preset threshold, or when a difference between the remaining traffic of the terminal and the required data traffic (or a ratio of the remaining traffic of the terminal to the required data traffic) is greater than or equal to a second preset threshold, step 208b is performed, that is, the terminal may automatically enable the data service, or when the required data traffic is greater than a first preset threshold, or when a difference between the remaining traffic of the terminal and the required data traffic (or a ratio of the remaining traffic of the terminal to the required data traffic) is less than a second preset threshold, step 206b is performed.

Further, for a process in which the terminal compares the required data traffic with a threshold, or a process in which the terminal compares the remaining traffic with the required data traffic, refer to the description in step 206a.

Step 206b: The terminal sends a prompt indicating whether to enable the data service.

The terminal may send the prompt in multiple manners. For example, the terminal notifies the user of currently required traffic by means of voice playing or by popping up words on a screen, and requests the user to make a choice. After the terminal sends the prompt, the user may choose whether to enable the data service, and notifies the terminal of a selection result by means of voice or by entering the result on the screen.

Step 207b: The terminal receives an indication for enabling the data service, and then performs step 208b.

After the user chooses to enable the data service, the terminal receives the indication, and then performs a subsequent step. If the user chooses not to enable the data service, the terminal terminates use of the first application, that is, terminates a voice control process.

Step 208b: The terminal enables the data service, and prohibits another application other than the first application from using the data service.

The terminal may enable the data service by turning on a data switch. For a process in which the terminal prohibits another application other than the first application from using the data service, refer to the description in step 102.

Step 209b: The terminal controls the first application to execute the voice instruction using the data service.

The first application of the terminal executes the voice instruction. The terminal sends the voice instruction to a server of a network side, then receives information returned by the server, and feeds back the returned information to the user.

The terminal determines, according to a value of the data traffic required for executing the voice instruction, whether to enable the data service. When the required data traffic is relatively small, the terminal automatically enables the data service. When the required data traffic is relatively large, the terminal enables the data service after user confirmation. Therefore, the terminal facilitates using of a voice control function by the user, and controls data traffic use.

As shown in FIG. 2E and FIG. 2F, after the voice print of the voice instruction is determined as the voice print of the user of the terminal in step 203, step 204a or step 204b may be not performed, but the following step 204c to step 209c may be performed.

Step 204c: The terminal obtains a service type corresponding to the voice instruction.

Step 205c: The terminal determines whether the service type corresponding to the voice instruction is a type in which the data service is allowed to be enabled. If the service type is a type in which the data service is allowed to be enabled, step 208c is performed, or if the service type is not a type in which the data service is allowed to be enabled, step 206c is performed.

Further, for step 204c and step 205c, refer to the descriptions in step 205a' and step 206a'.

Step 206c: The terminal sends a prompt indicating whether to enable the data service.

Step 207c: The terminal receives an indication for enabling the data service, and then performs step 208c.

Step 208c: The terminal enables the data service, and prohibits another application other than the first application from using the data service.

Step 209c: The terminal controls the first application to execute the voice instruction using the data service.

Further, for step 206c to step 209c, refer to the descriptions in step 206b to step 209b.

The terminal determines, according to the service type corresponding to the voice instruction, whether to enable the data service such that the terminal can facilitate, based on a presetting, using of a specific type of application by the user using a voice control function.

Referring to FIG. 2A, FIG. 2B, FIG. 2C, FIG. 2D, FIG. 2E, or FIG. 2F, step 210 may be further included after step 209a, step 209b, or step 209c.

Step 210: The terminal disables the data service after a preset time period.

After performing step 209a, step 209b, or step 209c, the terminal may immediately disable the data service, or may disable the data service after the preset time period.

Before the data service is disabled, if the terminal receives a voice instruction again, the terminal may still execute the newly received voice instruction using the data service.

Optionally, after step 209a, step 209b, or step 209c is performed, when the terminal receives a voice instruction again, if the terminal determines that the newly received voice instruction can be executed offline (that is, the data service is not required), the terminal may disable the data service, and execute the newly received voice instruction offline.

After the data service is disabled (or disabled), if the terminal receives a voice instruction again, the terminal may repeatedly perform step 201 to step 211.

It should be noted that, before step 201, the terminal may first start the first application.

Further, to reduce power consumption of the terminal, the terminal may be in a screen-off state in a process of performing step 201 to step 211. That is, the terminal may be in a screen-off state when the terminal starts the first application, receives a voice instruction, enables the data service, or uses the first application to execute the voice instruction using the data service. A data network is available only to a port of the first application (the voice assistant), and another module of the terminal is not woken up. When the terminal is in the screen-off state, after the terminal receives an execution result returned by the network side, the terminal may feedback the execution result to the user by means of voice playing. For example, when the voice instruction received by the terminal is "What will the weather be like tomorrow?", the terminal finally plays a weather status of tomorrow by means of voice.

Optionally, the terminal may determine, according to an actual situation, whether to perform the foregoing step in the screen-off state. For example, when starting the first application, or receiving a voice instruction, or enabling the data service, the terminal may be in a screen-off state. In a process in which the terminal controls the first application to execute the voice instruction using the data service, if the terminal determines that the terminal can respond to the voice instruction by means of voice, the terminal is in a screen-off state in the process of executing the voice instruction, or if the terminal determines that the terminal cannot respond to the voice instruction by means of voice, the terminal lights up the screen in a process of executing the voice instruction. For example, if the voice instruction received by the terminal is "What will the weather be like tomorrow?", the terminal may play a weather status of tomorrow by means of voice, and in this case, the terminal may remain in the screen-off state, or if the voice instruction received by the terminal is "Search for a driving route from a location 1 to a location 2", the terminal lights up the screen, and displays found map information on the screen.

In an actual processing process, when the terminal is in a screen-off state, the user may use a specific wakeup keyword to start the voice assistant (or the voice assistant voluntarily helps the user by means of real-time voice monitoring, semantic analysis, and automatic start), use a low-power voice chip to process a user voice request, and neither wakes up a primary processor nor lights up the screen. If a response result can be sent to the user by means of voice playing, a mobile phone remains in a screen-off state, and plays the response result by means of voice, or if a response result cannot be sent to the user by means of voice playing, a mobile phone wakes up the primary processor, lights up the screen, and displays the response result.

Figure 2G:
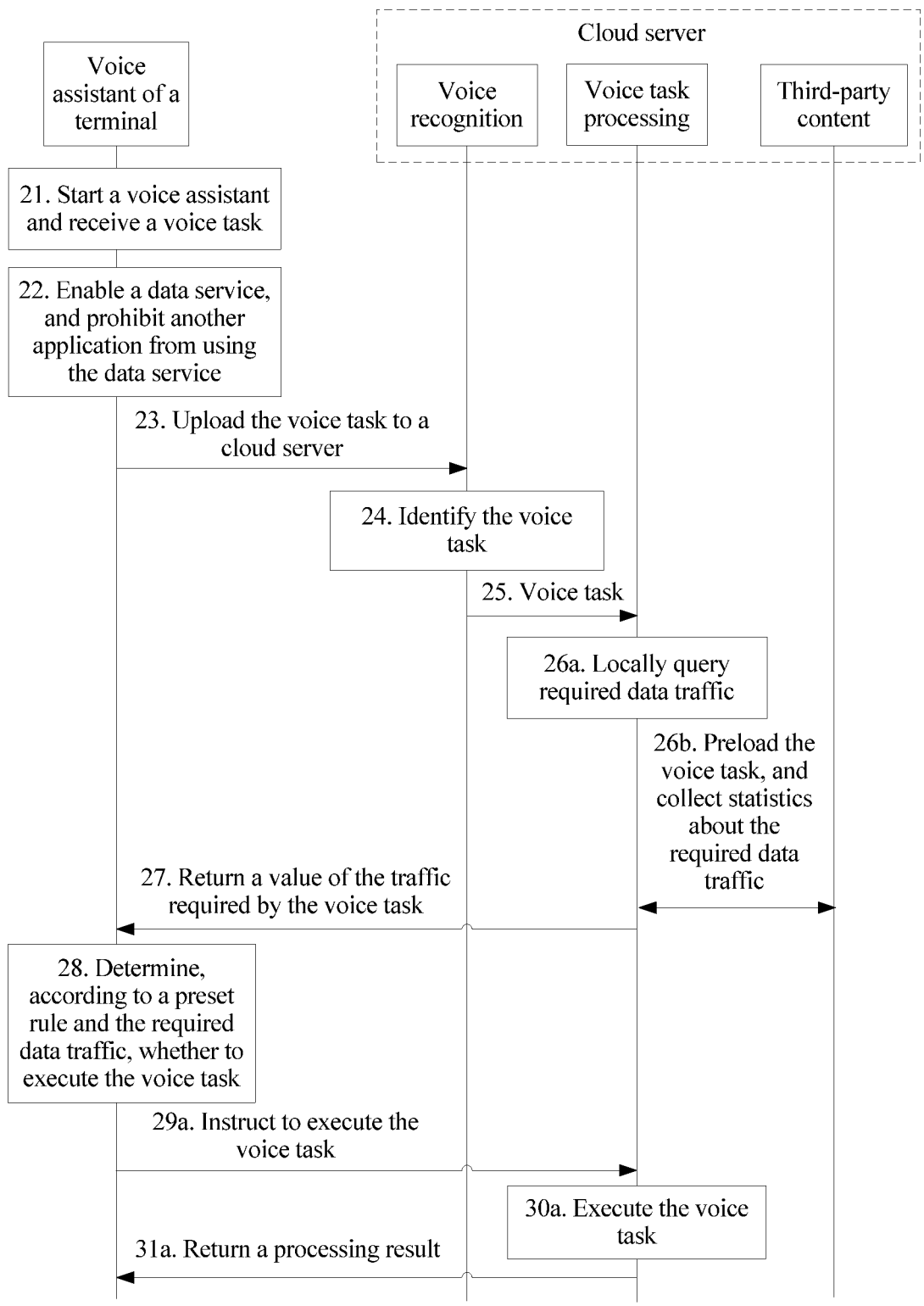
FIG. 2G is a schematic diagram of a method in which a terminal obtains, from a network side, data traffic required for executing a voice instruction according to an embodiment of the present disclosure.

FIG. 2G is a schematic diagram of a method in which a terminal obtains, from a network side, data traffic required for executing a voice instruction according to an embodiment of the present disclosure. The method is an optional manner in which the terminal obtains the data traffic. The method includes the following steps.

Step 21: The terminal receives a voice task after starting a voice assistant.

The voice task in this embodiment is a voice sent by a user. That is, the terminal may receive a voice sent by the user after starting the voice assistant. The voice task is equivalent to a voice instruction in another embodiment.

Step 22: The terminal enables a data service, and prohibits another application from using the data service.

Step 23: The terminal uploads the voice task to a cloud server (a server of the network side).

The cloud server may include a voice recognition module, a voice task processing module, and a third-party content module. The three modules may be separately disposed, or may be integrated into one module. The three modules may be function modules formed by software, or may be entities formed by hardware.

Step 24: A voice recognition module of the cloud server receives the voice task uploaded by the terminal, and identifies the voice task.

The voice task includes a user request. For example, the voice task is "What will the weather be like tomorrow?", and the user request in the voice task is a weather status of tomorrow.

Step 25: The voice recognition module sends the identified voice task to a voice task processing module.

Step 26*a* or step 26*b* may be performed after step 25, and then step 27 is performed.

Step 26*a*: The voice task processing module locally queries a historical record, or locally queries pre-stored information to obtain data traffic required by the voice task.

In a previous voice task processing process, the voice task processing module may record data traffic required for executing a voice task, to facilitate a subsequent query. Alternatively, the voice task processing module may pre-store various voice tasks and data traffic corresponding to the voice tasks.

Step 26*b*: The voice task processing module preloads, according to the voice task, content corresponding to the voice task. Further, the voice task processing module obtains, from the third-party content module, the content corresponding to the voice task, and then collects statistics about the data traffic corresponding to the voice task.

Step 26*a* and step 26*b* are not simultaneously performed, but either of the two steps is selected and performed.

Step 27: The voice task processing module returns the data traffic required for executing the voice task to the terminal.

Step 28: The terminal determines, according to a preset rule and the required data traffic, whether to execute the voice task. If the voice task is executed, step 29*a* is performed, or if the voice task is not executed, step 29*b* is performed.

For a specific process of determining, refer to the description in the foregoing embodiment.

Step 29*a*: The terminal instructs the voice task processing module to execute the voice task.

Step 30*a*: The voice task processing module executes the voice task, and obtains a result corresponding to the voice task. For a process of executing the voice task, refer to other approaches. The voice task processing module may invoke various internal and external services of the terminal to execute the voice task.

Step 31*a*: The voice task processing module returns the obtained result to the terminal.

Step 29*b*: The terminal asks a user whether to execute the voice task. If the user allows execution of the voice task, step 29*a* to step 31*a* are performed, if the user does not allow execution of the voice task, the voice assistant is exited, or the terminal directly exits the voice assistant. Step 29*b* is not shown in FIG. 2G.

Figure 3A:
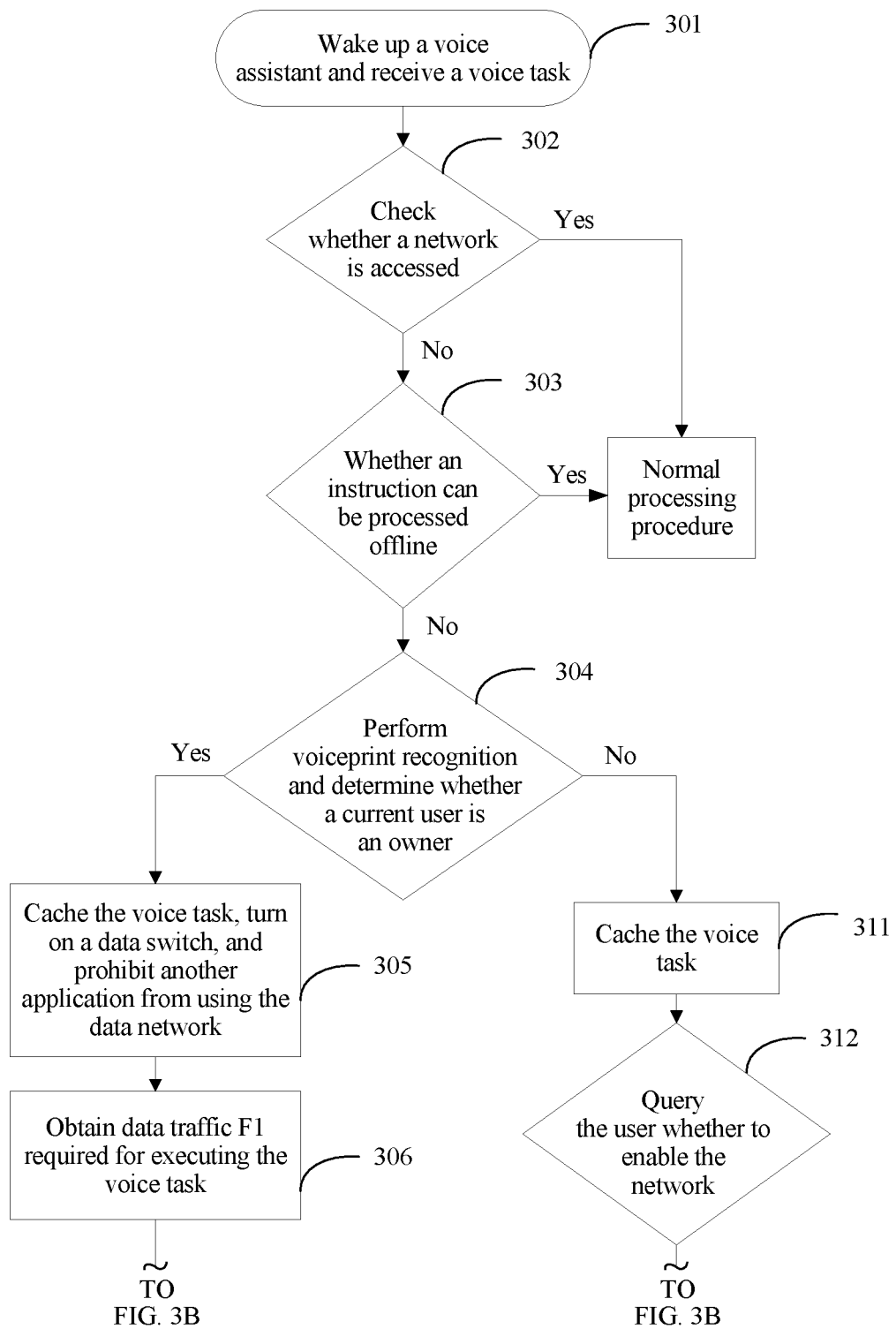
FIG. 3A and FIG. 3B are a schematic flowchart of another voice control processing method according to an embodiment of the present disclosure.
Figure 3B:
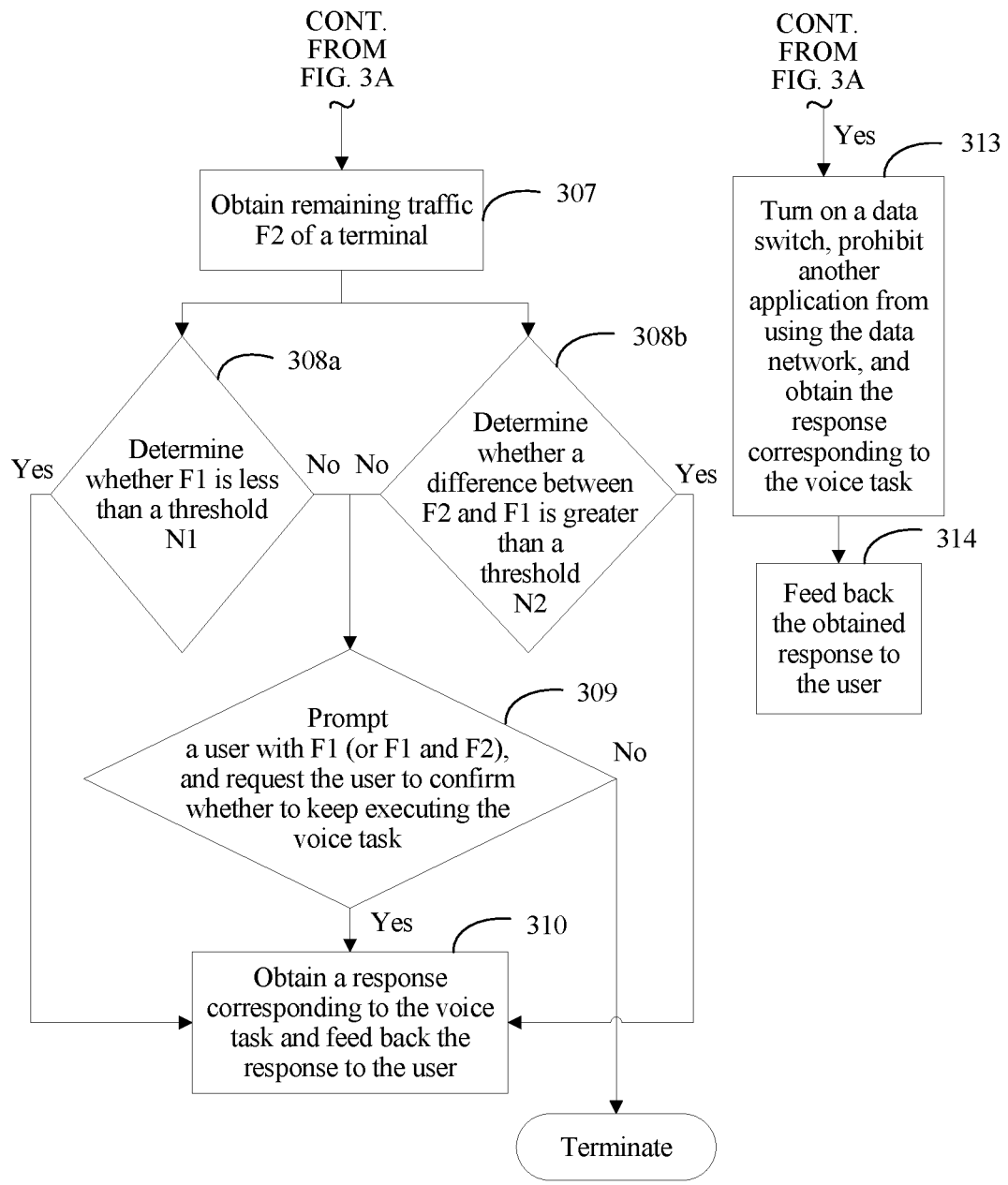

FIG. 3A and FIG. 3B are a schematic flowchart of another voice control processing method according to an embodiment of the present disclosure. FIG. 3A and FIG. 3B are a specific example for the methods provided in the foregoing embodiments, and are used merely as an example for description. As shown in FIG. 3A and FIG. 3B, the method includes the following steps.

Step 301: Wake up a voice assistant in a terminal, and receive a voice task sent by a user.

The user may wake up the voice assistant application in a preset manner.

Step 302: The terminal checks whether a data network is accessed. If the data network is accessed, a normal processing procedure is performed, or if the data network is not accessed, step 303 is performed.

The data network is equivalent to the data service in the foregoing embodiment. The normal processing procedure is a processing procedure the same as that in the other approaches.

Step 303: The terminal determines whether the voice task can be processed offline. If the voice task can be processed offline, a normal processing procedure is performed, that is, the voice task is executed offline, or if the voice task cannot be processed offline, step 304 is performed.

It should be noted that an execution sequence of step 302 and step 303 is not limited in this embodiment.

Step 304: The terminal performs voiceprint recognition on the voice task. If it is identified that the voice task is sent by an owner of the terminal, step 305 is performed, or if it is identified that the voice task is not sent by an owner of the terminal, step 311 is performed.

Step 305: The terminal caches the voice task, turns on a data switch, accesses the data network, and prohibits another application from using the data network.

Step 306: The terminal obtains, from a server side using the data network, data traffic F1 required for executing the voice task.

Step 307: The terminal obtains remaining traffic F2 of the terminal, and then performs step 308a or 308b.

Step 308a: The terminal determines whether the data traffic F1 is less than a preset threshold N1. If the data traffic F1 is less than the preset threshold N1, step 310 is performed, or if the data traffic F1 is not less than the preset threshold N1, step 309 is performed.

Step 308b: The terminal determines whether a difference between F2 and F1 (or a ratio of F2 to F1) is greater than a preset threshold N2. If the difference between F2 and F1 (or the ratio of F2 to F1) is greater than the preset threshold N2, step 310 is performed, or if the difference between F2 and F1 (or the ratio of F2 to F1) is not greater than the preset threshold N2, step 309 is performed.

Step 309: The terminal prompts the user with F1 (or F2, or F1 and F2), and requests the user to confirm whether to keep executing the voice task. If an indication for keeping executing the voice task is received, step 310 is performed, or if an indication for keeping executing the voice task is not received, the following steps are not performed.

In a specific implementation, step 307 may be not included, or step 306 may be not included, or both step 306 and step 307 may be included. When step 307 is not included, step 308a is performed after step 306. When step 306 is not included, step 308c (not shown in the figure) may be performed after step 307. Step 308c includes that the terminal determines whether F2 is greater than a preset threshold N3. If F2 is greater than the preset threshold N3, step 310 is performed, or if F2 is not greater than the preset threshold N3, step 309 is performed. When performing step 309, the terminal prompts the user with F2.

Step 310: The terminal obtains, from the server, a response corresponding to the voice task, and feeds back the response to the user. The procedure ends.

Step 311: The terminal caches the voice task.

Step 312: The terminal queries the user whether to enable the data network. If the data network is enabled, step 313 is performed, or if the data network is not enabled, the following steps are not performed.

Step 313: The terminal enables the data network, prohibits another application from using the data network, and obtains, from a network side, a response corresponding to the voice task.

Step 314: The terminal feeds back the obtained response to the user. The procedure ends.

Figure 4A:
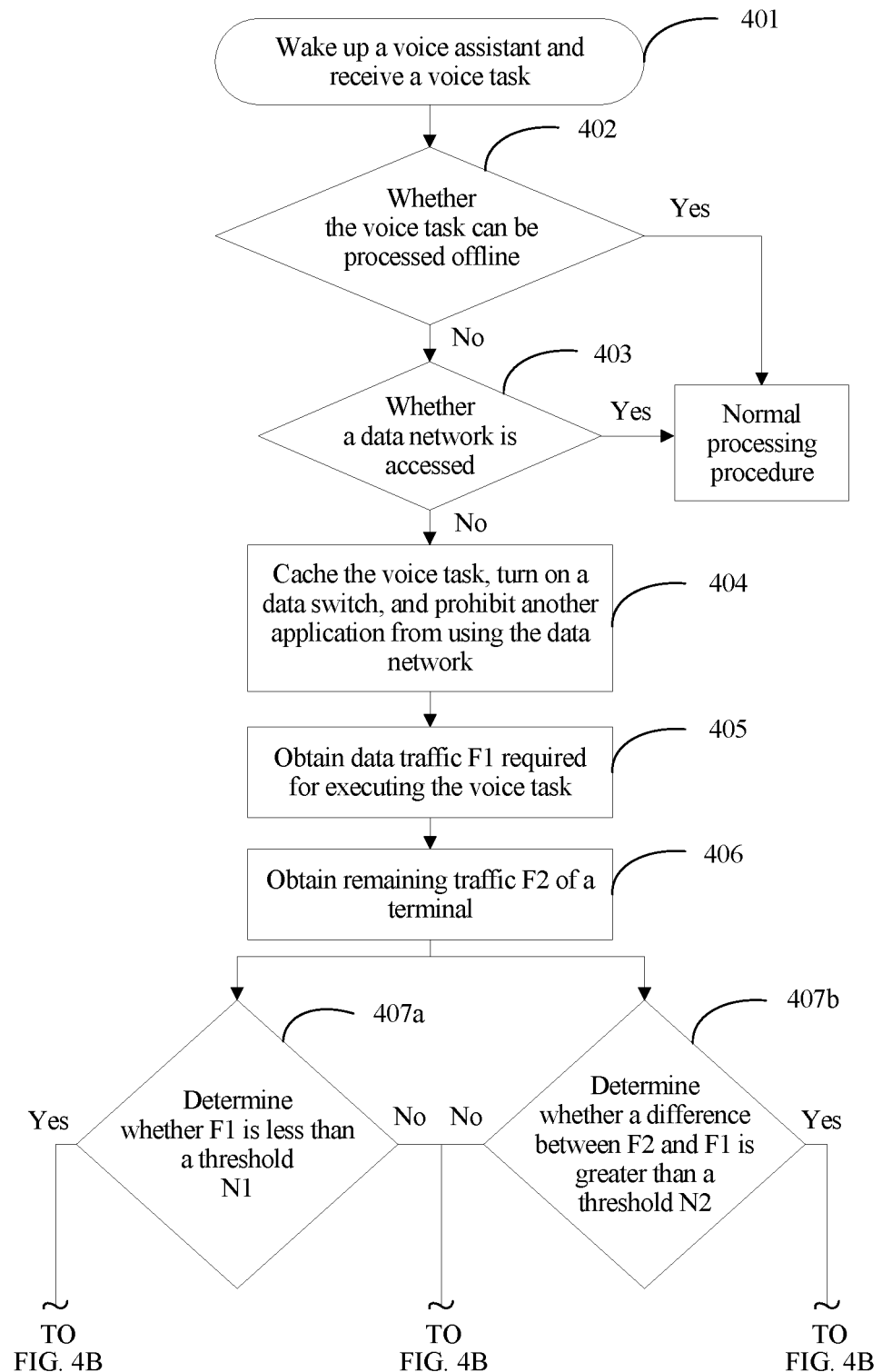
FIG. 4A and FIG. 4B are a schematic flowchart of another voice control processing method according to an embodiment of the present disclosure.
Figure 4B:
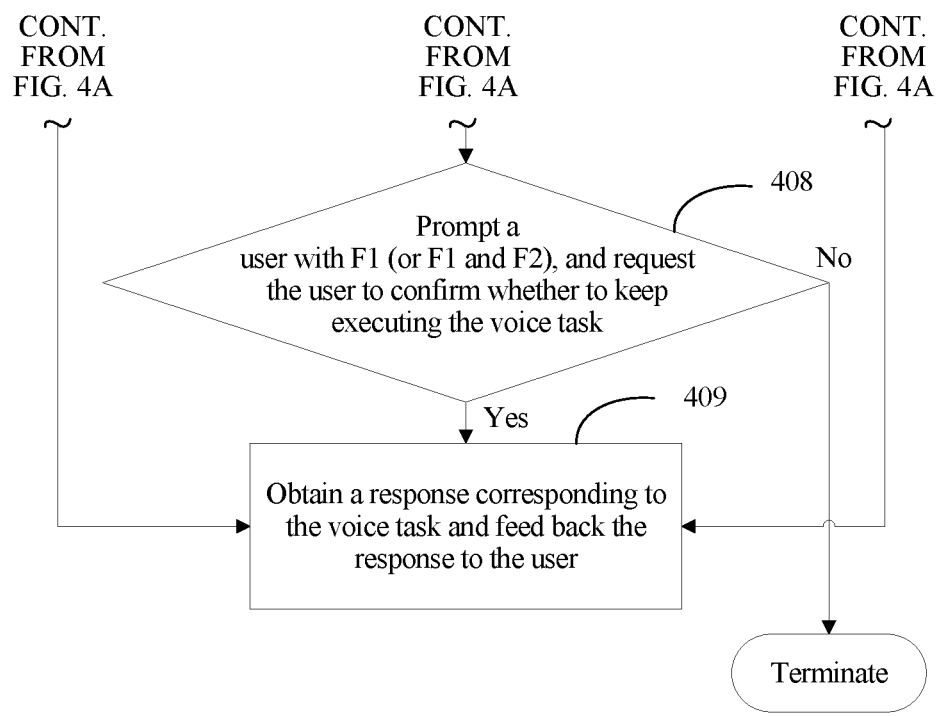

FIG. 4A and FIG. 4B are a schematic flowchart of another voice control processing method according to an embodiment of the present disclosure. FIG. 4A and FIG. 4B are a specific example for the methods provided in the foregoing embodiments, and are used merely as an example for description. As shown in FIG. 4A and FIG. 4B, the method includes the following steps.

Step 401: Wake up a voice assistant in a terminal, and receive a voice task sent by a user.

Step 402: The terminal determines whether the voice task can be processed offline. If the voice task can be processed offline, a normal processing procedure is performed, that is, the voice task is executed offline, or if the voice task cannot be processed offline, step 403 is performed.

Step 403: The terminal checks whether a data network is accessed. If the data network is accessed, a normal processing procedure is performed, or if the data network is not accessed, step 404 is performed.

The data network is equivalent to the data service in the foregoing embodiment. The normal processing procedure is a processing procedure the same as that in the other approaches.

Step 404: The terminal caches the voice task, turns on a data switch, accesses the data network, and prohibits another application from using the data network.

Step 405: The terminal obtains, from a server side using the data network, data traffic F1 required for executing the voice task.

Step 406: The terminal obtains remaining traffic F2 of the terminal, and then performs step 407a or 407b.

Step 407a: The terminal determines whether the data traffic F1 is less than a preset threshold N1. If the data traffic F1 is less than the preset threshold N1, step 409 is performed, or if the data traffic F1 is not less than the preset threshold N1, step 408 is performed.

Step 407b: The terminal determines whether a difference between F2 and F1 (or a ratio of F2 to F1) is greater than a preset threshold N2. If the difference between F2 and F1 (or the ratio of F2 to F1) is greater than the preset threshold N2, step 409 is performed, or if the difference between F2 and F1 (or the ratio of F2 to F1) is not greater than the preset threshold N2, step 408 is performed.

Step 408: The terminal prompts the user with F1 (or F2, or F1 and F2), and requests the user to confirm whether to keep executing the voice task. If an indication for keeping executing the voice task is received, step 409 is performed, or if an indication for keeping executing the voice task is not received, the following steps are not performed.

In a specific implementation, step 406 may be not included, or step 405 may be not included, or both step 405 and step 406 may be included. When step 406 is not included, step 407a is performed after step 405. When step 405 is not included, step 407c (not shown in the figure) may be performed after step 406. Step 407*c* is the terminal determines whether F2 is greater than a preset threshold N3. If F2 is greater than the preset threshold N3, step 409 is performed, or if F2 is not greater than the preset threshold N3, step 408 is performed. When performing step 408, the terminal prompts the user with F2.

Step 409: The terminal obtains, from the server, a response corresponding to the voice task, and feeds back the response to the user.

Figure 5A:
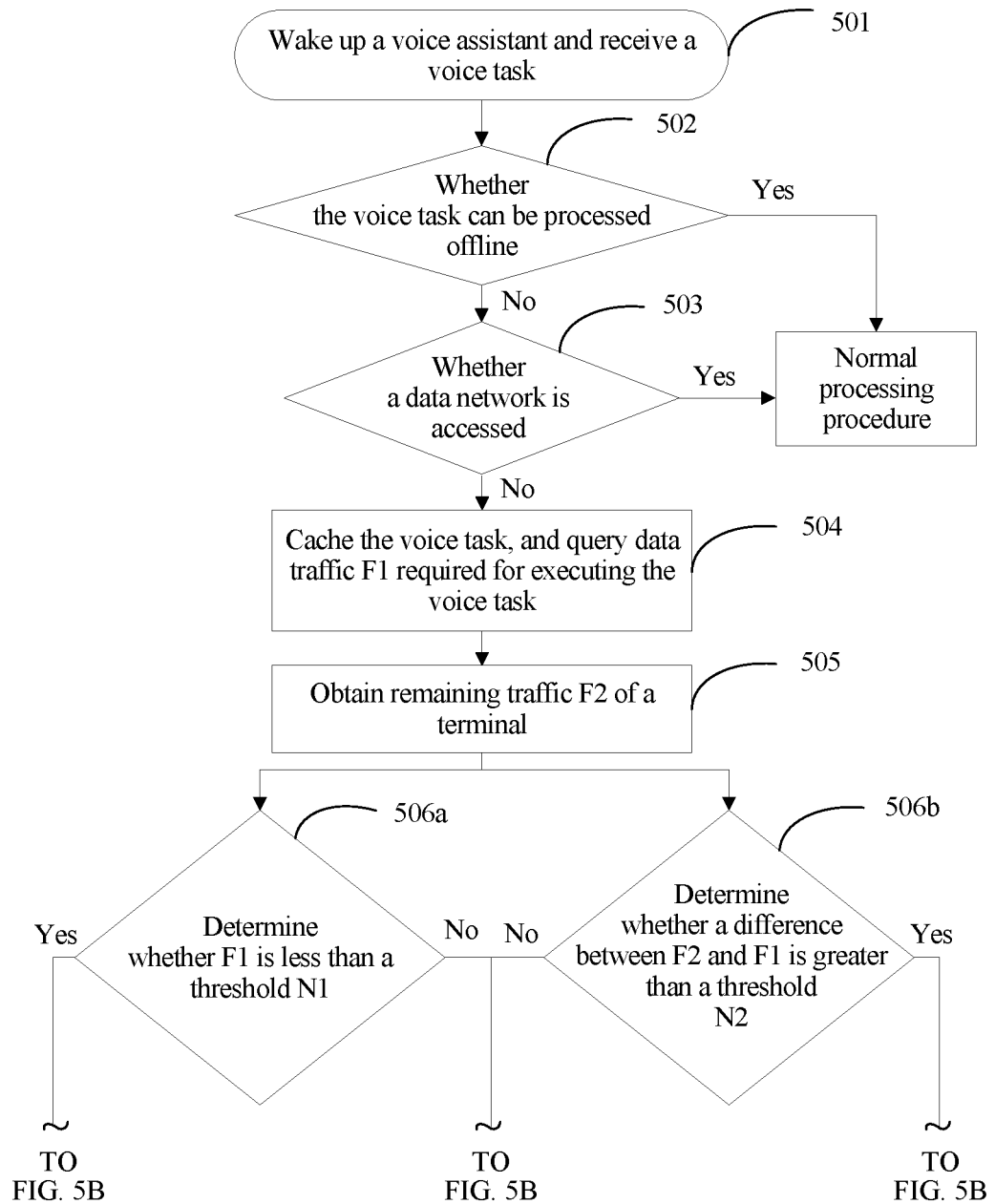
FIG. 5A and FIG. 5B are a schematic flowchart of another voice control processing method according to an embodiment of the present disclosure.
Figure 5B:
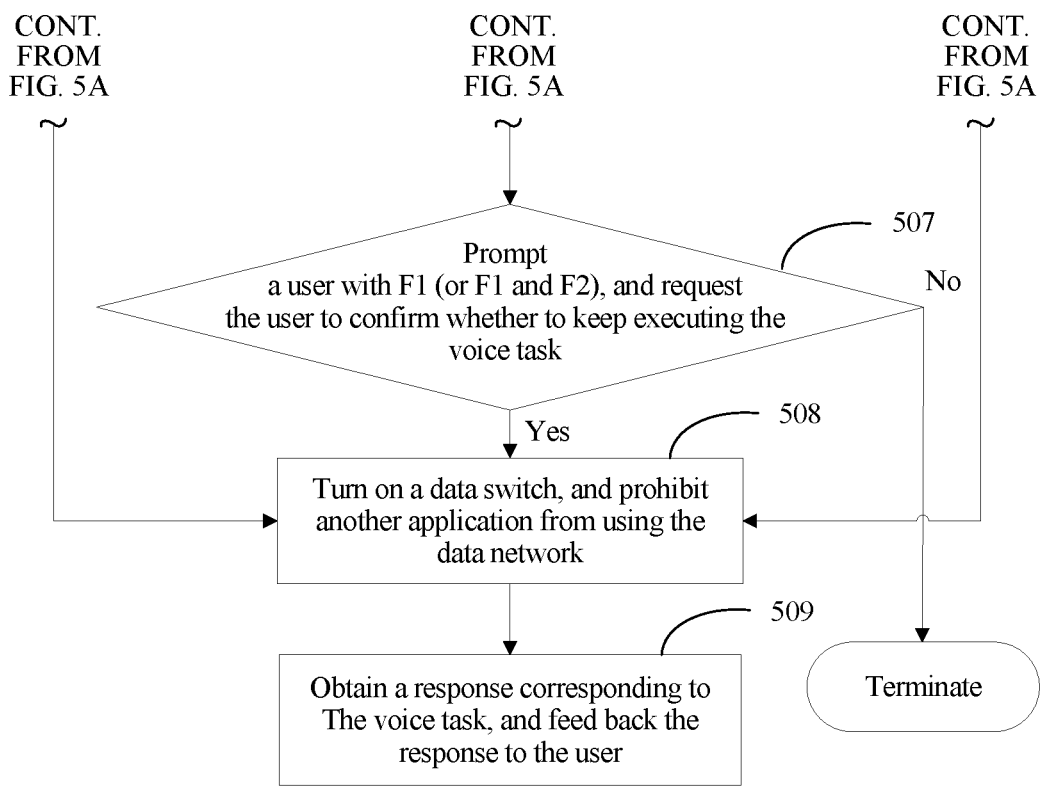

FIG. 5A and FIG. 5B are a schematic flowchart of another voice control processing method according to an embodiment of the present disclosure. FIG. 5A and FIG. 5B are a specific example for the methods provided in the foregoing embodiments, and are used merely as an example for description. As shown in FIG. 5A and FIG. 5B, the method includes the following steps.

Step 501: A voice assistant in a terminal is waken up, and a voice task sent by a user is received.

Step 502: The terminal determines whether the voice task can be processed offline. If the voice task can be processed offline, a normal processing procedure is performed, that is, the voice task is executed offline, or if the voice task cannot be processed offline, step 503 is performed.

Step 503: The terminal checks whether a data network is accessed. If the data network is accessed, a normal processing procedure is performed, or if the data network is not accessed, step 504 is performed.

Step 504: The terminal caches the voice task, and locally queries data traffic F1 required for executing the voice task.

Step 505: The terminal obtains remaining traffic F2 of the terminal, and then performs step 506*a* or 506*b*.

Step 506*a*: The terminal determines whether the data traffic F1 is less than a preset threshold N1. If the data traffic F1 is less than the preset threshold N1, step 508 is performed, or if the data traffic F1 is not less than the preset threshold N1, step 507 is performed.

Step 506*b*: The terminal determines whether a difference between F2 and F1 (or a ratio of F2 to F1) is greater than a preset threshold N2. If the difference between F2 and F1 (or the ratio of F2 to F1) is greater than the preset threshold N2, step 508 is performed, or if the difference between F2 and F1 (or the ratio of F2 to F1) is not greater than the preset threshold N2, step 507 is performed.

Step 507: The terminal prompts the user with F1 (or F2, or F1 and F2), and requests the user to confirm whether to keep executing the voice task. If an indication for keeping executing the voice task is received, step 508 is performed, or if an indication for keeping executing the voice task is not received, the following steps are not performed.

In a specific implementation, step 505 may be not included, or step 506 may be not included, or both step 505 and step 506 may be included. For details, refer to related descriptions in the embodiment shown in FIG. 3A and FIG. 3B, or FIG. 4A and FIG. 4B.

Step 508: The terminal turns on a data switch, accesses the data network, and prohibits another application from using the data network.

Step 509: The terminal obtains, from the server, a response corresponding to the voice task, and feeds back the response to the user.

Figure 6:
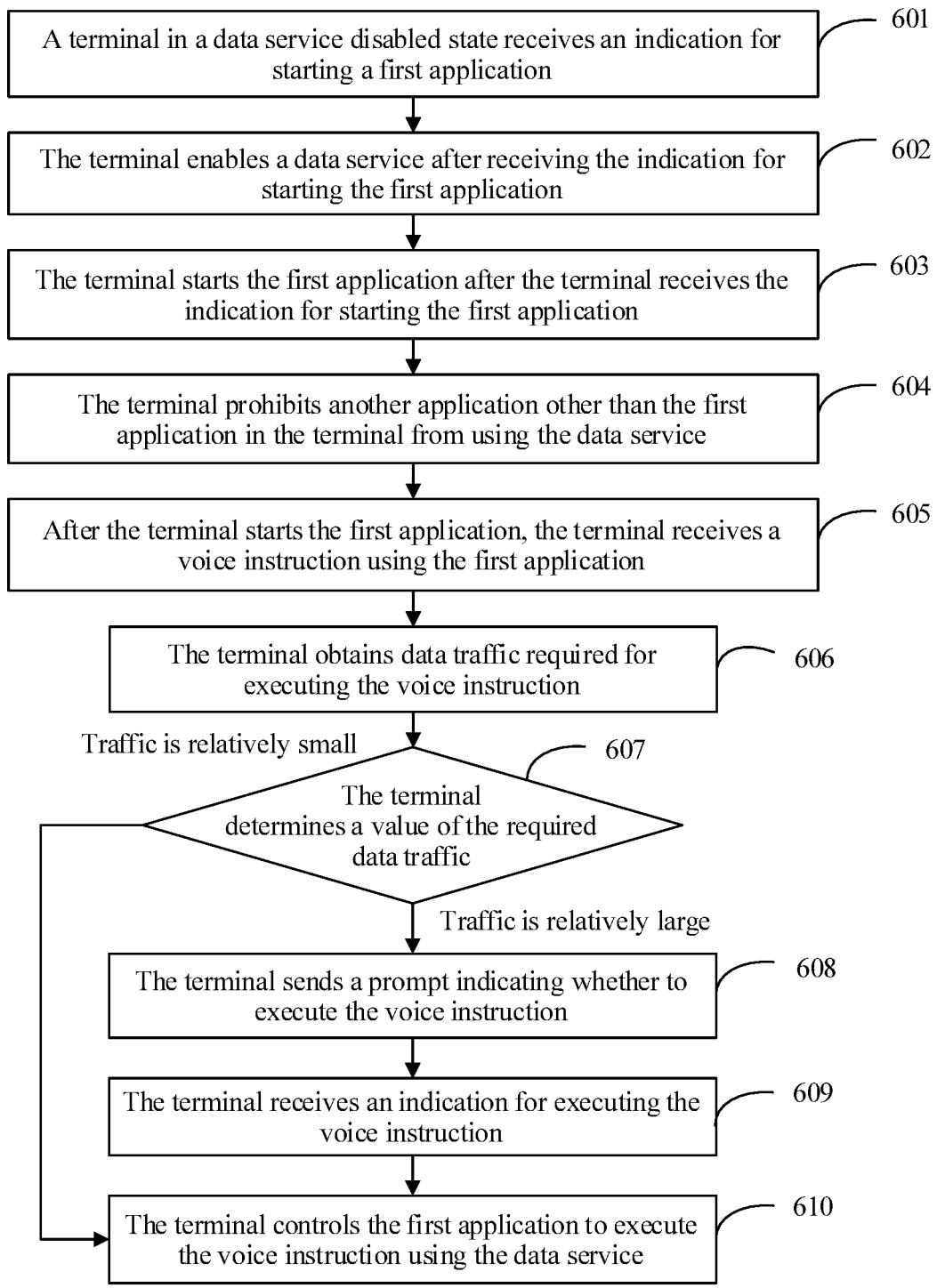
FIG. 6 is a schematic flowchart of another voice control processing method according to an embodiment of the present disclosure.

FIG. 6 is a schematic flowchart of another voice control processing method according to an embodiment of the present disclosure. In comparison with all the embodiments shown in FIG. 1 to FIG. 5A and FIG. 5B, a scenario in this embodiment is mainly as follows. A first application can be used only when a terminal enables a data service. Therefore, in this embodiment, a terminal in a data service disabled state needs to enable a data service after receiving an indication for starting a first application.

As shown in FIG. 6, the method in this embodiment may include the following steps.

Step 601: The terminal in a data service disabled state receives an indication for starting a first application. The first application is an application program used for voice control in the terminal.

The first application may be in an open state or a closed state. When the first application is in the closed state, the terminal may receive an indication for starting the first application. When a user needs to use the first application, a user may manually start the first application or wake up the first application by means of voice. Alternatively, the first application may be further started according to another preset condition.

This embodiment of the present disclosure is applied to a case in which the terminal in a data service disabled state receives an indication for starting the first application.

Step 602: The terminal enables a data service after receiving the indication for starting the first application.

In this embodiment, the first application can be used only when the terminal enables the data service. Therefore, the terminal enables the data service after the terminal receives the indication for starting the first application.

Step 603: The terminal starts the first application after the terminal receives the indication for starting the first application.

It should be noted that a sequence of step 602 and step 603 is not limited in this embodiment of the present disclosure.

Step 604: The terminal prohibits another application other than the first application in the terminal from using the data service.

The terminal may include multiple applications. After the terminal enables the data service, the terminal allows the first application to use the data service. In addition, the terminal may prohibit another application other than the first application from using the data service. For a specific prohibition method, refer to the description in step 102 in the foregoing embodiment.

A sequence of step 602, step 603, and step 604 is not limited in this embodiment of the present disclosure.

In this embodiment of the present disclosure, after receiving an indication for starting a first application, a terminal in a data service disabled state starts the first application and automatically enables a data service. In addition, the terminal prohibits another application other than the first application from using the data service. Therefore, the terminal in a data service disabled state can automatically enable the data service when starting the first application, and prohibits another application from using the data service in order to facilitate using of the first application by the user, and control data traffic use.

In another implementation, the following steps may be further included after step 604.

Step 605: After the terminal starts the first application, the terminal receives a voice instruction using the first application.

After starting the first application, the terminal may receive the voice instruction using the first application. In an optional implementation, the terminal may simultaneously receive an indication for starting the first application and a voice instruction. For example, when the user says "Hey SIRI, what will the weather be like tomorrow?", the terminal simultaneously receives an indication for starting SIRI and a voice instruction.

A sequence of step 605 and step 602 is not limited in this embodiment.

After receiving the voice instruction, the terminal may directly execute the voice instruction. Alternatively, the terminal may determine, according to data traffic required for executing the voice instruction, whether to execute the voice instruction. For details, refer to step 606 to step 610.

Step 606: The terminal obtains data traffic required for executing the voice instruction.

Step 607: The terminal determines a value of the required data traffic. If the required data traffic is relatively small, step 610 is performed, or if the required data traffic is relatively large, step 608 is performed. Further, if the required data traffic is less than or equal to a first preset threshold, or if a difference between remaining traffic of the terminal and the required data traffic (or a ratio of remaining traffic of the terminal to the required data traffic) is greater than or equal to a second preset threshold, step 610 is performed, or if the required data traffic is greater than a first preset threshold, or if a difference between remaining traffic of the terminal and the required data traffic (or a ratio of remaining traffic of the terminal to the required data traffic) is less than a second preset threshold, step 608 is performed.

Step 608: The terminal sends a prompt indicating whether to execute the voice instruction.

Step 609: The terminal receives an indication for executing the voice instruction, and then performs step 610.

Step 610: The terminal controls the first application to execute the voice instruction using the data service.

For a process of step 606 to step 610, refer to the descriptions in step 205a to step 209a in the foregoing embodiment.

After receiving the voice instruction, the terminal determines, according to the traffic required for executing the voice instruction, whether to automatically execute the voice instruction. When the required traffic is relatively small, the terminal automatically executes the voice instruction. Alternatively, when the required traffic is relatively large, user confirmation is required. Therefore, the first application is more conveniently used.

If the terminal in a data service disabled state receives an indication for starting the first application, the terminal automatically enables the data service, and prohibits another application from using the data service in order to conveniently use voice control, and effectively control a use status of data traffic. After enabling the data service, the terminal may further determine, based on potentially to-be-used data traffic, whether to execute the voice instruction in order to further control data traffic use.

Optionally, in another implementation, the foregoing step 606 to step 607 may be replaced with the following step 606' to step 607'.

Step 606': The terminal obtains a service type corresponding to the voice instruction.

Step 607': The terminal determines whether the service type corresponding to the voice instruction is a type in which the data service is allowed to be enabled. If the service type is a type in which the data service is allowed to be enabled, step 610 is performed, or if the service type is not a type in which the data service is allowed to be enabled, step 608 is performed.

For a process of step 606' to step 607', refer to the descriptions in step 205a' to step 206a' in the foregoing embodiment.

After receiving the voice instruction, the terminal determines, according to the service type to which the voice instruction belongs, whether to automatically execute the voice instruction. When the service type is a preset type in which the data service is allowed to be enabled, the terminal automatically executes the voice instruction. Therefore, the first application is more conveniently used.

After enabling the data service, the terminal may further determine, based on the service type corresponding to the voice instruction, whether to execute the voice instruction such that the terminal can facilitate, based on a presetting, using of a specific type of application by the user using a voice control function.

Figure 7:
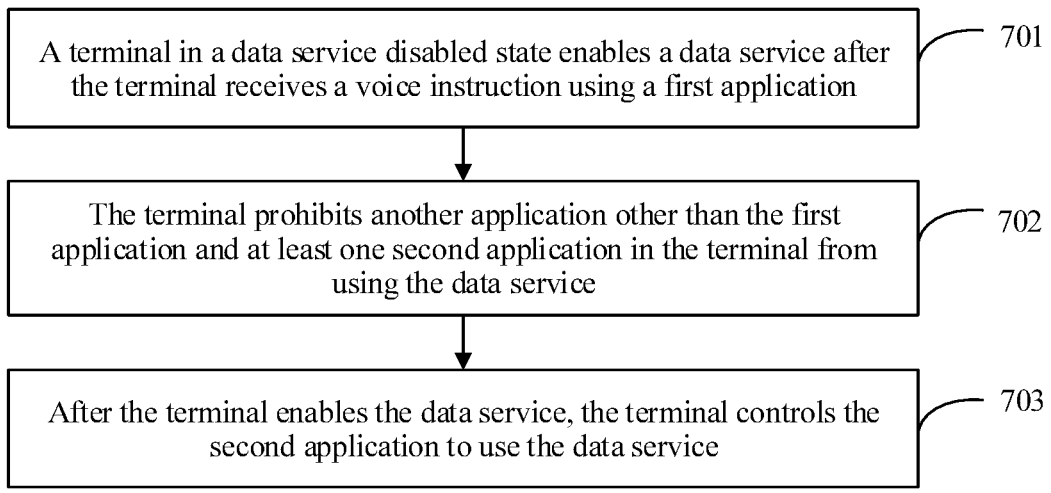
FIG. 7 is a schematic flowchart of another voice control processing method according to an embodiment of the present disclosure.

FIG. 7 is a schematic flowchart of another voice control processing method according to an embodiment of the present disclosure. In comparison with all the embodiments shown in FIG. 1 to FIG. 6, a scenario in this embodiment is mainly as follows. A voice instruction received by a terminal using a first application includes an instruction for using a second application. Therefore, in this embodiment, the terminal may allow the second application and the first application to use a data service, and prohibit another application from using the data service. Alternatively, the terminal may allow only the second application to use the data service.

As shown in FIG. 7, the method in this embodiment may include the following steps.

Step 701: A terminal in a data service disabled state enables a data service after the terminal receives a voice instruction using a first application. The first application is an application program used for voice control in the terminal, and the voice instruction includes an instruction for using at least one second application in the terminal.

Further, for this step, refer to step 101 in the foregoing embodiment. The terminal may include multiple applications. In this embodiment, an application that the voice instruction instructs to use is referred to as the second application. The second application is different from the first application. The second application may be, for example, Auto Navi Map, AMAZON, or WECHAT (a social networking Application program). It should be noted that the voice instruction in this embodiment includes an instruction for using one or more second applications. For example, the voice instruction is "Start WECHAT" or "Hey SIRI, start WECHAT".

The terminal may automatically enable the data service after receiving the voice instruction.

Step 702: The terminal prohibits another application other than the first application and the at least one second application in the terminal from using the data service.

For a specific operation of prohibiting use of the data service, refer to the description in step 102 in the foregoing embodiment. The terminal may prohibit another application other than the first application and the second application from using the data service. That is, for the second application that the voice instruction instructs to use, the terminal allows the second application to use the data service. For the first application, the terminal may allow the first application to use the data service, or may prohibit the first application from using the data service. In addition, the terminal prohibits another application other than the first application and the second application from using the data service.

Step 703: After the terminal enables the data service, the terminal controls the second application to use the data service.

After the terminal enables the data service, the second application may use the data service to start work. The terminal may not determine data traffic required by the second application and may not determine a service type to which the second application belongs, but directly allow the second application to use the data service. In another implementation, the terminal may also determine, according to the data traffic required by the second application or the service type to which the second application belongs, whether to allow the second application to use the data service. For a specific process of determining, refer to the foregoing embodiments. For example, when the voice instruction is "Start Youku (a video website)", a prompt may be still sent to a user, and Youku is started after user confirmation is obtained.

In this embodiment, after receiving a voice instruction using a first application, a terminal in a data service disabled state obtains a second application that the voice instruction instructs to use, then allows the second application to use a data service, and prohibits another application from using the data service. When the terminal is in a data service disabled state, a user may conveniently wake up, by means of voice, the second application that needs to use the data service, and multiple user operations are not required. In addition, another application is prohibited from using the data service, and data traffic of the terminal is automatically managed and controlled.

It should be noted that, with reference to the embodiment shown in FIG. 7, in all the embodiments shown in FIG. 1 to FIG. 6, if the voice instruction includes an indication for executing the second application, the second application may be allowed to use the data service.

Figure 8:
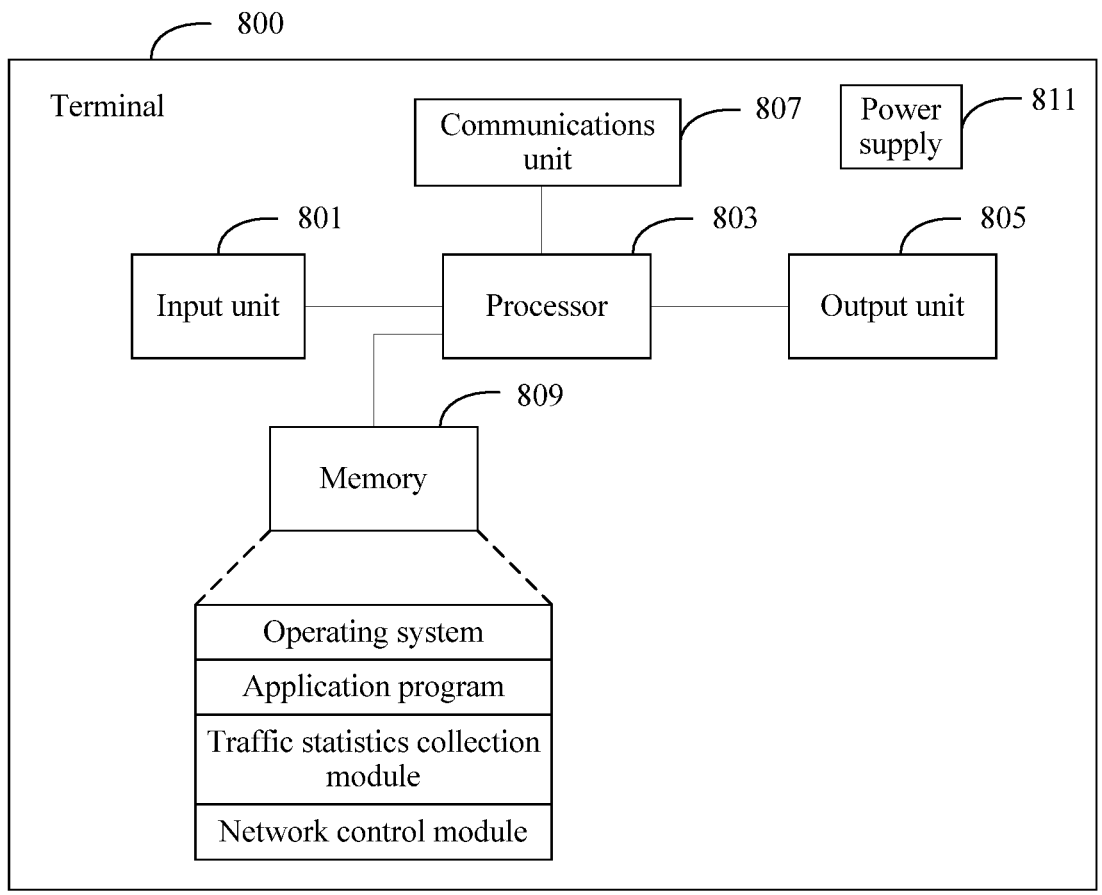
FIG. 8 is a schematic diagram of a terminal according to an embodiment of the present disclosure.

FIG. 8 is a schematic diagram of a terminal according to an embodiment of the present disclosure. The terminal provided in this embodiment of the present disclosure may be configured to perform the method in each embodiment shown in FIG. 1 to FIG. 7. For ease of description, only a part related to this embodiment of the present disclosure is shown. For technical details that are not disclosed, refer to all the embodiments of the present disclosure shown in FIG. 1 to FIG. 7.

As shown in FIG. 8, the terminal 800 may include components such as an input unit 801, a processor 803, an output unit 805, a communications unit 807, a memory 809, and a power supply 811. These components communicate with each other using one or more buses. A person skilled in the art may understand that the structure of the terminal shown in FIG. 8 does not constitute a limitation on this embodiment of the present disclosure. The structure may not only be a bus structure, but may also be a star structure, and may further include more or fewer components than those shown in the figure, or combine some parts, or have different part arrangements. In this embodiment of the present disclosure, the terminal 800 may be any mobile or portable electronic device. The terminal 800 includes, but is not limited to, a mobile phone, a mobile computer, a tablet computer, a PDA, a smart television, and a combination of the foregoing two or more items.

The input unit 801 is configured to implement interaction between a user and the terminal 800 and/or configured to enter information to the terminal 800. For example, the input unit 801 may receive digit or character information that is entered by the user in order to generate signal input related to user setting or function control. In a specific implementation of the present disclosure, the input unit 801 may be a touch control panel, may be another man-machine interface such as a substantive input key or a microphone, or may be another external information capture apparatus such as a camera lens. The touch control panel may also be referred to as a touchscreen or a touch control screen, and may collect an operation action of touching or approaching performed by the user on the touch control panel, for example, an operation action performed by the user on the touch control panel or at a location close to the touch control panel using any proper object or accessory such as a finger or a stylus. A corresponding connection apparatus is driven according to a preset program. Optionally, the touch control panel may include two parts a touch detection apparatus and a touch controller. The touch detection apparatus detects a touch operation of the user, converts the detected touch operation into an electrical signal, and transmits the electrical signal to the touch controller. The touch controller receives the electrical signal from the touch detection apparatus, converts the electrical signal into touch point coordinates, and then transmits the touch point coordinates to the processor. The touch controller may further receive and execute a command sent by the processor. In addition, the touch control panel may be implemented using multiple types such as a resistive type, a capacitive type, an infrared, and a surface acoustic wave. In another implementation of the present disclosure, the substantive input key used by the input unit may include but is not limited to one or more of a physical keyboard, a function key (for example, a volume control button or a power on/off button), a trackball, a mouse, a joystick, or the like. The input unit 801 in the form of a microphone may collect a voice that is input by the user or an environment, and convert the voice into a command that is in a form of an electrical signal and that can be executed by the processor 803.

In another implementation of the present disclosure, the input unit 801 may further be a sensing component in various types, for example, a Hall component that is configured to detect a physical quantity of the electronic device, such as a force, a torque, a pressure, a stress, a position, a displacement, a speed, acceleration, an angle, an angular velocity, a quantity of revolutions, a rotational speed, and a time at which a working state changes, and converts the physical quantity into an electric quantity to perform detection and control. Other sensing components may further include a gravity sensor, a tri-axis accelerometer, a gyroscope, and the like.

The processor 803 is a control center of the terminal 800, and is connected to all parts of the entire terminal 800 using various interfaces and lines. The processor 803 implements various functions of the terminal and/or process data by running or performing a software program stored in the memory 809 and/or a module stored in the memory 809 and invoking data stored in the memory 809. The processor 803 may include an integrated circuit (IC), for example, may include a single packaged IC or may include multiple connected packaged ICs with a same function or different functions. For example, the processor 803 may include only a central processing unit (CPU), or may be a combination of a graphical processing unit (GPU), a digital signal processor (DSP), and a control chip (for example, a baseband chip) in the communications unit 807. In this implementation of the present disclosure, the CPU may be a single computing core, or may include multiple computing cores.

The communications unit 807 is configured to establish a communications channel such that the terminal 800 is connected to a remote server using the communications channel, and download data from the remote server. The communications unit 807 may include communications modules such as a WLAN module, a BLUETOOTH module, and a baseband module. A radio frequency (RF) circuit corresponding to the communications modules is used to perform wireless local area network communication, BLUETOOTH communication, infrared communication and/or cellular communications system communication, for example, WCDMA and/or HSDPA. The communications modules are configured to control communication between all components in the terminal, and may support direct memory access (DMA).

In different implementations of the present disclosure, each communications module in the communications unit 807 generally appears in a form of an IC chip, and may be combined selectively and does not need to include all communications modules and corresponding antenna groups. For example, the communications unit 807 may include only a baseband chip, an RF chip, and a corresponding antenna in order to provide a communication function in a cellular communications system. The terminal 800 can access a cellular network or the Internet using a wireless communications connection established by the communications unit 807, for example, WLAN access or WCDMA access. In some optional implementations of the present disclosure, a communications module in the communications unit 807, for example, the baseband module, may be integrated into the processor 803, typically, such as an APQ+MDM platform provided by the QUALCOMM company.

The output unit 805 includes, but is not limited to, an image output unit and a voice output unit. The image output unit is configured to output a text, a picture, and/or a video. The image output unit may include a display panel, for example, a display panel configured in a form of a liquid crystal display (LCD), an organic light-emitting diode (OLED), a field emission display (FED), or the like. Alternatively, the image output unit may include a reflective display, for example, an electrophoretic display, or a display that uses an interferometric modulation of light technology. The image output unit may include a single display or multiple displays in different sizes. In a specific implementation of the present disclosure, the touch control panel used by the foregoing input unit may also be used as the display panel of the output unit. For example, after detecting a gesture operation of touching or approaching on the touch control panel, the touch control panel transmits the gesture operation to the processor to determine a type of a touch event, and then the processor 803 provides corresponding visual output on the display panel according to the type of the touch event. In FIG. 8, the input unit 801 and the output unit 805 serve as two independent parts to implement input and output functions of the terminal 800. However, in some embodiments, the touch control panel and the display panel may be integrated to implement the input and output functions of the terminal 800. For example, the image output unit may display various graphical user interfaces (GUI), and set the graphical user interfaces as virtual control components. The graphical user interfaces include but are not limited to a window, a scroll bar, an icon, and a clipboard such that the user performs an operation in a touch control manner.

In a specific implementation of the present disclosure, the image output unit includes a filter and an amplifier that are configured to filter and amplify a video output by the processor. An audio output unit includes a digital-to-analog converter. The digital-to-analog converter is configured to convert an audio signal output by the processor from a digital format to an analog format.

The memory 809 may be configured to store a software program and a module. The processor 803 performs various function applications of the terminal and implements data processing by running the software program and the module that are stored in the memory 809. The memory 809 mainly includes a program storage area and a data storage area. The program storage area may store an operating system, and an application program required by at least one function, such as a sound playing program or an image playing program. The data storage area may store data (such as audio data or a phone book) created according to use of the terminal 800, and the like. In a specific implementation of the present disclosure, the memory may include a volatile memory such as a random access memory (RAM), or a phase change RAM (PRAM), or a magnetoresistive RAM (MRAM), and may further include a nonvolatile memory such as at least one magnetic disk storage device, an electrically erasable programmable read-only memory (EEPROM), or a flash device such as a NOR flash memory or a NAND flash memory. The nonvolatile memory stores an operating system and an application program that are executed by the processor 803. The processor 803 loads, from the nonvolatile memory, a running program and data to a memory, and stores digital content in a mass storage apparatus. The operating system includes various components and/or drives that facilitate communication between software and hardware and that is configured to control and manage a conventional system task, for example, memory management, storage device control, or power management. In this implementation of the present disclosure, the operating system may be an ANDROID system of the GOOGLE company, an IOS system developed by an APPLE company, a WINDOWS operating system developed by the MICROSOFT company, or the like, or an embedded operating system such as VXWORKS.

The application program includes any application installed on the terminal. The application includes, but is not limited to, a browser, an email, an instant messaging service, word processing, keyboard virtualization, a widget, encryption, digital copyright management, voice recognition, voice reproduction, positioning (for example, a function provided by a Global Positioning System (GPS)), music playback, or the like.

The power supply 811 is configured to supply power to various parts of the terminal to maintain running of the parts. Generally, the power supply may 811 be a built-in battery, such as a common lithium-ion battery or a nickel metal hydride (NiMH) battery, or may include an external power supply that directly supplies power to the terminal 800, such as an alternating current (AC) adapter. In some implementations of the present disclosure, the power supply may further have a wider definition. For example, the power supply 811 may further include a power management system, a charging system, a power fault detection circuit, a power converter or inverter, a power status indicator (such as a light emitting diode), and any other components that are related to power generation, management, and distribution of the terminal.

To implement the solution provided in each embodiment of the present disclosure, two new modules may be added to the memory of the terminal a traffic statistics collection module and a network control module.

The traffic statistics collection module is configured to collect statistics about traffic required by a voice task of a voice assistant, including a historical traffic record.

The network control module is configured to control enabling and disabling of a data service, and control another application whether to use the data service.

The processor implements functions of the traffic statistics collection module and the network control module by executing a corresponding instruction in the memory.

The processor 803 may execute a program instruction stored in the memory 809, to implement the voice control processing method shown in any embodiment in FIG. 1 to FIG. 7.

Figure 9:
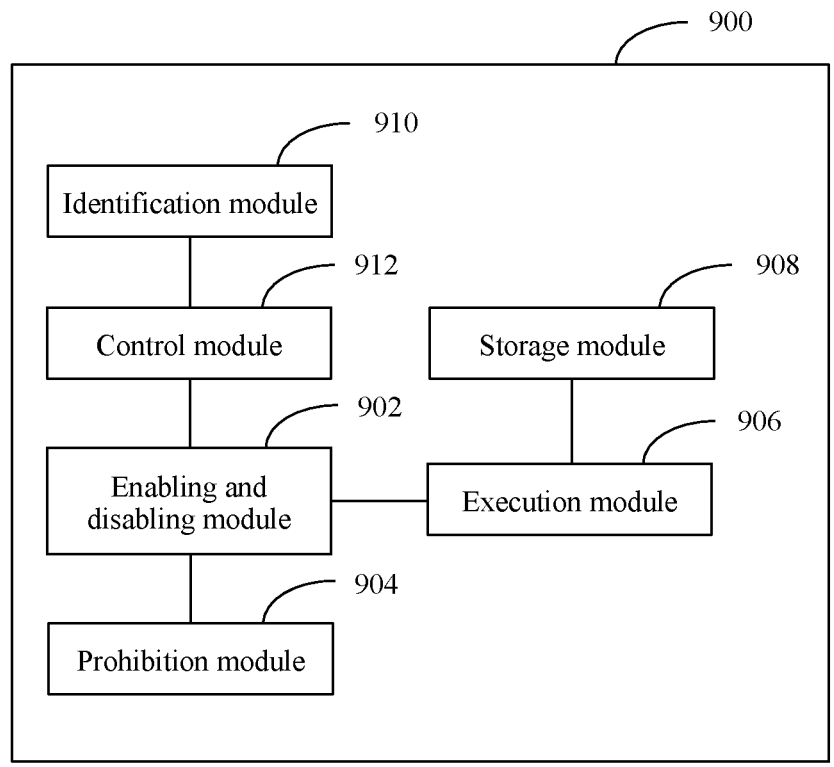
FIG. 9 is a schematic diagram of a voice control processing apparatus according to an embodiment of the present disclosure.

FIG. 9 is a schematic diagram of a voice control processing apparatus according to an embodiment of the present disclosure. The voice control processing apparatus provided in this embodiment of the present disclosure is included in a terminal, and may be configured to perform the method in each embodiment shown in FIG. 1 to FIG. 5A and FIG. 5B. For ease of description, only a part related to this embodiment of the present disclosure is shown. For technical details that are not disclosed, refer to the embodiments shown in FIG. 1 to FIG. 5A and FIG. 5B.

As shown in FIG. 9, the voice control processing apparatus 900 is included in the terminal. The apparatus 900 includes an enabling and disabling module 902, a prohibition module 904, and an execution module 906.

The enabling and disabling module 902 is configured to enable a data service after the terminal in a data service disabled state receives a voice instruction using a first application. The first application is an application program used for voice control in the terminal.

The prohibition module 904 is configured to prohibit another application other than the first application in the terminal from using the data service.

The execution module 906 is configured to control the first application to execute the voice instruction using the data service after the enabling and disabling module 902 enables the data service.

Optionally, the enabling and disabling module 902 is further configured to automatically enable the data service.

Optionally, the enabling and disabling module 902 is further configured to obtain data traffic required for executing the voice instruction, automatically enable the data service if the required data traffic is less than or equal to a first preset threshold, or if a difference between remaining traffic of the terminal and the required data traffic (or a ratio of remaining traffic of the terminal to the required data traffic) is greater than or equal to a second preset threshold, or send a prompt indicating whether to enable the data service, if the required data traffic is greater than the first preset threshold, or if a difference between remaining traffic of the terminal and the required data traffic (or a ratio of remaining traffic of the terminal to the required data traffic) is less than the second preset threshold, and enable the data service after an indication for enabling the data service is received.

Optionally, the enabling and disabling module 902 is further configured to obtain a service type corresponding to the voice instruction, and if the service type is a type in which the data service is allowed to be enabled, automatically enable the data service, or if the service type is not a type in which the data service is allowed to be enabled, send a prompt indicating whether to enable the data service, and enable the data service after an indication for enabling the data service is received.

Optionally, the execution module 906 is further configured to, after the terminal enables the data service, obtain, using the data service, data traffic required for executing the voice instruction, and control the first application to execute the voice instruction using the data service, if the required data traffic is less than or equal to a first preset threshold, or if a difference between remaining traffic of the terminal and the required data traffic (or a ratio of remaining traffic of the terminal to the required data traffic) is greater than or equal to a second preset threshold, or send a prompt indicating whether to execute the voice instruction, if the required data traffic is greater than the first preset threshold, or if a difference between remaining traffic of the terminal and the required data traffic (or a ratio of remaining traffic of the terminal to the required data traffic) is less than the second preset threshold, and control the first application to execute the voice instruction using the data service, after an indication for executing the voice instruction is received.

Optionally, the execution module 906 is further configured to, after the terminal enables the data service, obtain a service type corresponding to the voice instruction, and if the service type is a type in which the data service is allowed to be enabled, control the first application to execute the voice instruction using the data service, or if the service type is not a type in which the data service is allowed to be enabled, send a prompt indicating whether to execute the voice instruction, and control the first application to execute the voice instruction using the data service, after an indication for executing the voice instruction is received.

Optionally, the apparatus 900 further includes a storage module 908 configured to store the voice instruction after the terminal in a data service disabled state receives the voice instruction using the first application.

Optionally, the apparatus 900 further includes an identification module 910 and a control module 912. The identification module 910 is configured to, before the terminal enables the data service, perform voiceprint recognition on the voice instruction. The control module 912 is configured to, if the identification module 910 identifies a voice print of the voice instruction as a voice print of a user of the terminal, control the enabling and disabling module 902 to perform a step of enabling the data service.

Optionally, the enabling and disabling module 902 is further configured to disable the data service after a preset time period that is after the first application executes the voice instruction using the data service.

Optionally, the execution module 906 is further configured to start the first application before the terminal in a data service disabled state receives the voice instruction using the first application. The terminal is in a screen-off state when the first application of the terminal is started, the terminal receives the voice instruction, the terminal enables the data service, or the first application executes the voice instruction using the data service.

Optionally, the execution module 906 is further configured to start the first application before the terminal in a data service disabled state receives the voice instruction using the first application. The terminal is in a screen-off state when the first application of the terminal is started. In a process in which the first application executes the voice instruction using the data service, if the terminal can respond to the voice instruction by means of voice, the terminal is in a screen-off state in the process in which the first application executes the voice instruction, or if the terminal cannot respond to the voice instruction by means of voice, the terminal is in a screen-on state in the process in which the first application executes the voice instruction.

Figure 10:
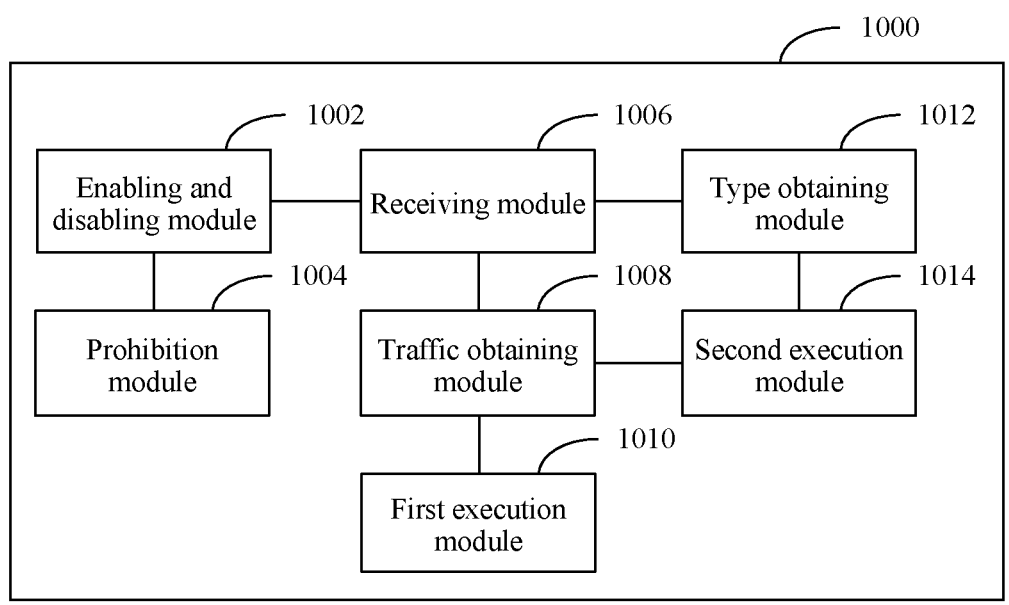
FIG. 10 is a schematic diagram of another voice control processing apparatus according to an embodiment of the present disclosure.

FIG. 10 is a schematic diagram of another voice control processing apparatus according to an embodiment of the present disclosure. The voice control processing apparatus provided in this embodiment of the present disclosure is included in a terminal, and may be configured to perform the method in the embodiment shown in FIG. 6. For ease of description, only a part related to this embodiment of the present disclosure is shown. For technical details that are not disclosed, refer to the embodiment shown in FIG. 6.

As shown in FIG. 10, the voice control processing apparatus 1000 is included in the terminal. The apparatus 1000 includes an enabling and disabling module 1002 and a prohibition module 1004.

The enabling and disabling module 1002 is configured to, after the terminal in a data service disabled state receives an indication for starting the first application, enable a data service and start a first application. The first application is an application program used for voice control in the terminal.

The prohibition module 1004 is configured to prohibit another application other than the first application in the terminal from using the data service.

Optionally, the apparatus 1000 further includes a receiving module 1006, a traffic obtaining module 1008, and a first execution module 1010.

The receiving module 1006 is configured to, after the first application is started, receive a voice instruction using the first application. The traffic obtaining module 1008 is configured to obtain data traffic required for executing the voice instruction. The first execution module 1010 is configured to control the first application to execute the voice instruction using the data service if the required data traffic is less than or equal to a first preset threshold, or if a difference between remaining traffic of the terminal and the required data traffic (or a ratio of remaining traffic of the terminal to the required data traffic) is greater than or equal to a second preset threshold. The first execution module 1010 is further configured to send, by the terminal, a prompt indicating whether to execute the voice instruction, if the required data traffic is greater than the first preset threshold, or if a difference between remaining traffic of the terminal and the required data traffic (or a ratio of remaining traffic of the terminal to the required data traffic) is less than the second preset threshold, and control the first application to execute the voice instruction using the data service, after an indication for executing the voice instruction is received.

Optionally, the apparatus 1000 further includes a receiving module 1006, a type obtaining module 1012, and a second execution module 1014.

The receiving module 1006 is configured to, after the first application is started, receive a voice instruction using the first application. The type obtaining module 1012 is configured to obtain a service type corresponding to the voice instruction. The second execution module 1014 is configured to, if the service type is a type in which the data service is allowed to be enabled, control the first application to execute the voice instruction using the data service. The second execution module 1014 is further configured to, if the service type is not a type in which the data service is allowed to be enabled, send a prompt indicating whether to execute the voice instruction, and control the first application to execute the voice instruction using the data service, after an indication for executing the voice instruction is received.

Figure 11:
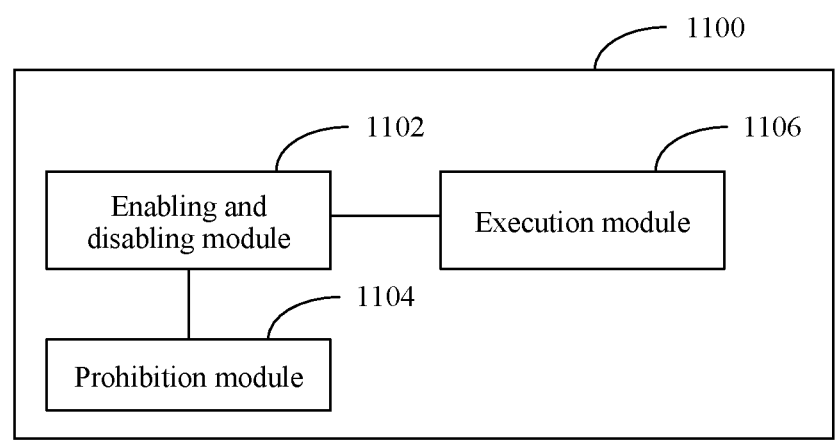
FIG. 11 is a schematic diagram of another voice control processing apparatus according to an embodiment of the present disclosure.

FIG. 11 is a schematic diagram of another voice control processing apparatus 1100 according to an embodiment of the present disclosure. The voice control processing apparatus 1100 provided in this embodiment of the present disclosure is included in a terminal, and may be configured to perform the method in the embodiment shown in FIG. 7. For ease of description, only a part related to this embodiment of the present disclosure is shown. For technical details that are not disclosed, refer to the embodiment shown in FIG. 7.

As shown in FIG. 11, the voice control processing apparatus 1100 is included in the terminal. The apparatus 1100 may include an enabling and disabling module 1102, a prohibition module 1104, and an execution module 1106.

The enabling and disabling module 1102 is configured to enable a data service after the terminal in a data service disabled state receives a voice instruction using a first application. The first application is an application program used for voice control in the terminal, and the voice instruction includes an instruction for using at least one second application in the terminal.

The prohibition module 1104 is configured to prohibit another application other than the first application and the at least one second application in the terminal from using the data service.

The execution module 1106 is configured to control the second application to use the data service, after the terminal enables the data service.

Optionally, the prohibition module 1104 is further configured to prohibit the first application from using the data service.

Embodiments of the present disclosure further provide a terminal that includes a voice control processing apparatus shown in FIG. 9, FIG. 10, or FIG. 11.

With descriptions of the foregoing embodiments, a person skilled in the art may clearly understand that the present disclosure may be implemented by hardware, firmware or a combination thereof. When the present disclosure is implemented by software, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another. The storage medium may be any available medium accessible to a computer. The following provides an example but does not impose a limitation The computer-readable medium may include a RAM, a ROM, an EEPROM, a compact disc ROM (CD-ROM), or another optical disc storage or disk storage medium, or another magnetic storage device, or any other medium that can carry or store expected program code in a form of an instruction or a data structure and can be accessed by a computer. In addition, any connection may be appropriately defined as a computer-readable medium. For example, if software is transmitted from a website, a server or another remote source using a coaxial cable, an optical fiber cable, a twisted pair, a digital subscriber line (DSL) or wireless technologies such as infrared ray, radio and microwave, the coaxial cable, the optical fiber cable, the twisted pair, the DSL or the wireless technologies such as the infrared ray, the radio and the microwave are included in definition of a medium to which they belong. For example, a disk and disc used by the present disclosure includes a compact disc (CD), a laser disc, an optical disc, a digital versatile disc (DVD), a floppy disk and a BLU-RAY DISC, where the disk generally copies data by a magnetic means, and the disc copies data optically by a laser means. The foregoing combination should also be included in the protection scope of the computer-readable medium.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A voice control processing method, comprising:
   receiving, by a terminal in a data service disabled state, a voice instruction using a first application comprising an application program used for voice control in the terminal;
   comparing, by the terminal, an amount of data traffic required by the voice instruction to a first preset threshold;
   enabling, by the terminal, a data service in response to the amount of data traffic required by the voice instruction being less than or equal to the first preset threshold, wherein the data service allows the terminal to communicate with an external network;
   prohibiting, by the terminal, another application other than the first application in the terminal from using the data service; and
   controlling, by the terminal after enabling the data service, the first application to execute the voice instruction using the data service.

2. The voice control processing method of claim 1, wherein enabling the data service comprises automatically enabling, by the terminal, the data service.

3. The voice control processing method of claim 2, further comprising:
   performing, by the terminal, voiceprint recognition on the voice instruction before enabling the data service; and
   enabling, by the terminal, the data service when a voice print of the voice instruction is identified as a voice print of a user of the terminal.

4. The voice control processing method of claim 1, wherein after the terminal in the data service disabled state receives the voice instruction using the first application, the voice control processing method further comprises storing, by the terminal, the voice instruction.

5. The voice control processing method of claim 4, further comprising:
   performing, by the terminal, voiceprint recognition on the voice instruction before enabling the data service; and
   enabling, by the terminal, the data service when a voice print of the voice instruction is identified as a voice print of a user of the terminal.

6. The voice control processing method of claim 1, further comprising:
   performing, by the terminal, voiceprint recognition on the voice instruction before enabling the data service; and
   enabling, by the terminal, the data service when a voice print of the voice instruction is identified as a voice print of a user of the terminal.

7. The voice control processing method of claim 1, wherein after controlling the first application to execute the voice instruction using the data service, the voice control processing method further comprises disabling, by the terminal, the data service after a preset time period.

8. The voice control processing method of claim 1, further comprising:
   starting, by the terminal, the first application before the terminal in the data service disabled state receives the voice instruction using the first application, wherein the terminal is in a screen-off state when the terminal starts the first application; and
   enabling, by the terminal, the data service to enable the first application to execute the voice instruction using the data service.

9. The voice control processing method of claim 1, further comprising starting, by the terminal, the first application before the terminal in the data service disabled state receives the voice instruction using the first application, wherein the terminal is in a screen-off state when the terminal starts the first application, and when controlling the first application to execute the voice instruction using the data service, the terminal is configured to:
   be in the screen-off state in the process in which the first application executes the voice instruction when the terminal can respond to the voice instruction by voice; and
   be in a screen-on state in the process in which the first application executes the voice instruction when the terminal cannot respond to the voice instruction by voice.

10. The voice control processing method of claim 1, wherein enabling the data service comprises:
    obtaining, by the terminal, a service type corresponding to the voice instruction;
    automatically enabling, by the terminal, the data service when the service type comprises a type in which the data service is allowed to be enabled;
    sending, by the terminal, a prompt indicating whether to enable the data service when the service type not comprising a type in which the data service is allowed to be enabled; and
    enabling, by the terminal, the data service after receiving an indication for enabling the data service.

11. The voice control processing method of claim 1, wherein controlling the first application to execute the voice instruction comprises:
    obtaining, by the terminal, a service type corresponding to the voice instruction after the terminal enables the data service;
    controlling, by the terminal, the first application to execute the voice instruction using the data service when the service type comprises a type in which the data service is allowed to be enabled;
    sending, by the terminal, a prompt indicating whether to execute the voice instruction when the service type not comprising a type in which the data service is allowed to be enabled; and
    controlling, by the terminal after receiving an indication for executing the voice instruction, the first application to execute the voice instruction using the data service.

12. A terminal, comprising:
    a memory comprising instructions; and
    a processor coupled to the memory and configured to execute the instructions to:
    receive a voice instruction in a data service disable state using a first application comprising an application program used for voice control in the terminal;
    compare an amount of data traffic required by the voice instruction to a first preset threshold;
    enable the data service in response to the amount of data traffic required by the voice instruction being less than or equal to the first preset threshold, wherein the data service allows the terminal to communicate with an external network;
    prohibit another application other than the first application in the terminal from using the data service; and
    control the first application to execute the voice instruction using the data service after enabling the data service.

13. The terminal of claim 12, wherein the external network comprises a Long Term Evolution network.

14. The terminal of claim 12, wherein the external network comprises a Wireless Local Area Network.

15. The terminal of claim 12, wherein the first application comprises a voice assistance application.

16. The terminal of claim 12, wherein the terminal displays a powered-off screen when the voice instruction is received.

17. A computer program product comprising computer-executable instructions for storage on a non-transitory computer-readable medium that, when executed by a processor, cause a terminal to:
receive a voice instruction in a data service disabled state using a first application comprising an application program used for voice control in the terminal;
compare an amount of data traffic required by the voice instruction to a first preset threshold;
enable a data service in response to the amount of data traffic required by the voice instruction being less than or equal to the first preset threshold, wherein the data service allows the terminal to communicate with an external network;
prohibit another application other than the first application in the terminal from using the data service; and
control the first application to execute the voice instruction using the data service after enabling the data service.

18. The computer program product of claim 17, wherein the external network comprises a Long Term Evolution network.

19. The computer program product of claim 17, wherein the external network comprises a Wireless Local Area Network.

20. The computer program product of claim 17, wherein the first application comprises a voice assistance application, and wherein the terminal displays a powered-off screen when the voice instruction is received.

* * * * *